United States Patent
Zhang et al.

(10) Patent No.: US 12,555,999 B2
(45) Date of Patent: Feb. 17, 2026

(54) MICROGRID SYSTEM, POWER CONVERTER, AND CONTROL METHOD FOR POWER CONVERTER

(71) Applicant: Huawei Digital Power Technologies Co., Ltd., Shenzhen (CN)

(72) Inventors: Meiqing Zhang, Shanghai (CN); Shuo Wang, Shanghai (CN); Mingxuan Dong, Shanghai (CN); Kai Xin, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 7 days.

(21) Appl. No.: 18/667,399

(22) Filed: May 17, 2024

(65) Prior Publication Data

US 2024/0305096 A1  Sep. 12, 2024

Related U.S. Application Data

(63) Continuation of application No. PCT/CN2024/072527, filed on Jan. 16, 2024.

(30) Foreign Application Priority Data

Feb. 7, 2023 (CN) .......................... 202310150573.1

(51) Int. Cl.
*H02J 3/00* (2006.01)
*H02J 3/0012* (2026.01)

(52) U.S. Cl.
CPC ................................ *H02J 3/0012* (2020.01)

(58) Field of Classification Search
CPC ................................ H02J 3/0012; H02J 3/381
USPC ......................................................... 307/52
See application file for complete search history.

(56) References Cited

FOREIGN PATENT DOCUMENTS

| CN | 104201706 A | 12/2014 |
|---|---|---|
| CN | 108494008 A | 9/2018 |
| CN | 109638895 A | 4/2019 |
| CN | 107994603 B | 7/2020 |
| CN | 116231636 A | 6/2023 |

OTHER PUBLICATIONS

Shen Xia et al:"Fault-Ride Through Strategy for Islanded Microgrids via Dynamically Reconfigurable Voltage Reference",Oct. 9, 2022 (Oct. 9, 2022), pp. 1-6, XP034235233.

*Primary Examiner* — Hal Kaplan
(74) *Attorney, Agent, or Firm* — Conley Rose, P.C.

(57) ABSTRACT

An output end of a power converter is connected to a microgrid bus, and the microgrid bus is connected to an external power grid through a grid-tied switch. When detecting that a power grid fails, the power converter is in a first current source control mode. After a duration of the power grid failure reaches a first duration, the power converter switches from the first current source control mode to a first voltage source control mode. The first current source control mode is a current source failure ride-through control mode. The first voltage source control mode is a voltage source failure ride-through control mode. The first duration is less than a second duration, and the second duration is a time interval between a moment at which the power grid fails and a moment at which the grid-tied switch is turned off.

20 Claims, 10 Drawing Sheets

MICROGRID SYSTEM, POWER CONVERTER, AND CONTROL METHOD FOR POWER CONVERTER

CROSS-REFERENCE TO RELATED APPLICATIONS

This is a continuation of International Patent Application No. PCT/CN2024/072527 filed on Jan. 16, 2024, which claims priority to Chinese Patent Application No. 202310150573.1 filed on Feb. 7, 2023. The disclosures of the aforementioned applications are hereby incorporated by reference in their entireties.

TECHNICAL FIELD

This disclosure relates to the field of power supply technologies, and in particular, to a microgrid system, a power converter, and a control method for a power converter.

BACKGROUND

A microgrid includes distributed power generation, power load, monitoring, protection, and automation apparatuses (including an energy storage apparatus if necessary), and is a small power supply system that can achieve an internal electric power and energy balance. The microgrid can operate in two modes: an on-grid mode and an off-grid mode. In the on-grid mode, in a normal case, the microgrid and a large power grid operate in a grid-tied manner, and the microgrid provides redundant electric energy for the large power grid, or the large power grid supplies power to a local load and charges a battery. In the off-grid mode, when detecting that the large power grid fails or power quality does not meet a requirement, the microgrid is disconnected from the large power grid to enter an islanding state, and a distributed power supply and an energy storage battery in the microgrid supply power to the local load.

With an increase in a distribution voltage level and a capacity of the large power grid to which the microgrid is connected, the microgrid and all distributed power supplies and energy storage batteries of the microgrid have become an important part of safety and stability of a power system. When the large power grid fails and a voltage drops, the microgrid immediately switches to the off-grid mode. This causes great power disturbance to the large power grid. In addition, most voltage drops in the large power grid are temporary. To be specific, most failures that occur are not permanent failures, and the system can operate properly after a circuit breaker is turned off and then automatically turned on. Therefore, when the large power grid fails, it is particularly important that the microgrid can provide voltage support for the large power grid and complete on-grid/off-grid mode switching before the circuit breaker is turned off.

SUMMARY

This disclosure provides a microgrid system, a power converter, and a control method for a power converter, to enable the microgrid system to provide voltage support for an external power grid when a power grid fails, and complete on-grid/off-grid mode switching before a grid-tied switch is turned off.

According to a first aspect, this disclosure provides a microgrid system. The microgrid system includes at least one power converter, a microgrid bus, and a grid-tied switch. An input end and an output end of the power converter are connected to a direct current (DC) power supply and the microgrid bus respectively. The microgrid bus is connected to an external power grid through the grid-tied switch. When detecting that a power grid fails, the power converter is in a first current source control mode. After duration of the power grid failure reaches first duration, the power converter switches from the first current source control mode to a first voltage source control mode. The power grid includes the external power grid or the microgrid system. The first current source control mode is a current source failure ride-through control mode. The first voltage source control mode is a voltage source failure ride-through control mode. When the power grid fails, the grid-tied switch is turned off after second duration elapses, where the second duration is greater than the first duration. It can be understood that the power converter in the microgrid system controls the power converter to be in the current source failure ride-through control mode when detecting that the power grid fails, and controls the power converter to switch to the voltage source failure ride-through control mode before the grid-tied switch is turned off, so that the microgrid system provides voltage support for the external power grid when the power grid fails, and completes on-grid/off-grid mode switching before the grid-tied switch is turned off. In this way, the microgrid system performs both a failure ride-through support function and an on-grid/off-grid switching function, to ensure stable operation of the microgrid system.

With reference to the first aspect, in a first possible implementation, in the first current source control mode, the power converter controls an output voltage of the power converter based on a voltage drop value of the microgrid bus in a case in which the power grid fails, to provide reactive current support for the external power grid, and implement a current source failure ride-through support feature of the microgrid system. In the first voltage source control mode, the power converter controls an output voltage of the power converter based on a maximum preset current amplitude in a preset current amplitude range, to provide voltage and frequency support for the external power grid, and implement a voltage source failure ride-through support feature of the microgrid system.

With reference to the first possible implementation of the first aspect, in a second possible implementation, the power converter obtains a first reference output current value based on the voltage drop value of the microgrid bus in a case in which the power grid fails, obtains a first reference output modulated voltage value based on the first reference output current value and a first reference angular frequency value, and controls the output voltage of the power converter based on the first reference output modulated voltage value, so that the power converter is in the first current source control mode, and the power converter provides specific voltage support for the external power grid based on the voltage drop value. Further, the microgrid system can provide voltage support for the external power grid when the power grid fails, to implement the current source failure ride-through support feature.

With reference to the first possible implementation of the first aspect or the second possible implementation of the first aspect, in a third possible implementation, the power converter obtains a second reference output current value based on the maximum preset current amplitude and an equivalent impedance angle of the external power grid, obtains a second reference output modulated voltage value based on the second reference output current value and a second reference angular frequency value, and controls the output voltage of the power converter based on the second reference output modulated voltage value, so that the power converter is in the first voltage source control mode. It can be understood that the power converter switches from the current source failure ride-through control mode to the voltage source failure ride-through control mode after the duration of the power grid failure reaches the first duration. This can reduce a risk of instability of the microgrid system if the power converter does not switch to the voltage source control mode before the grid-tied switch is turned off, and therefore improve stability of the microgrid system.

With reference to the third possible implementation of the first aspect, in a fourth possible implementation, an initial reference output current value and an initial reference angular frequency value of the power converter in the first voltage source control mode are the first reference output current value and the first reference angular frequency value of the power converter in the first current source control mode at a switching moment respectively. This can reduce a degree of current and voltage fluctuation during mode switching, and improve current and voltage smoothness during mode switching.

With reference to any one of the first aspect to the fourth possible implementation of the first aspect, in a fifth possible implementation, the power converter is further in a second current source control mode before the power grid fails, where in the second current source control mode, the power converter controls an output voltage of the power converter based on a reference output active current value and a reference output reactive current value. It can be understood that, before the power grid fails, the microgrid system is in an on-grid mode, and all power converters are in the second current source control mode, namely, a normal control mode in a current source control mode. This helps improve stability of the microgrid system.

With reference to the fifth possible implementation of the first aspect, in a sixth possible implementation, the power converter determines the reference output active current value and the reference output reactive current value as a third reference output current value, obtains a third reference output modulated voltage value based on the third reference output current value and a third reference angular frequency value, and controls the output voltage of the power converter based on the third reference output modulated voltage value, so that the power converter is in the second current source control mode.

With reference to the fifth possible implementation of the first aspect or the sixth possible implementation of the first aspect, in a seventh possible implementation, the power converter further obtains the reference output active current value based on a reference output active power value and an actual output active power value of the power converter. It can be understood that a manner of obtaining the reference output active current value is simple. This helps improve operation efficiency of the power converter, to improve operation efficiency of the microgrid system.

With reference to the fifth possible implementation of the first aspect or the sixth possible implementation of the first aspect, in an eighth possible implementation, the power converter includes a DC/DC circuit, a DC bus, and a DC/alternating current (AC) circuit, and an output end of the DC/DC circuit is connected to an input end of the DC/AC circuit through the DC bus. The power converter further obtains the reference output active current value based on a reference bus voltage and an actual bus voltage of the DC bus. It can be understood that the reference output active current value may alternatively be obtained based on the bus voltage of the DC bus. The reference output active current value can be flexibly obtained in various manners.

With reference to the fifth possible implementation of the first aspect or the sixth possible implementation of the first aspect, in a ninth possible implementation, the power converter further obtains the reference output reactive current value based on a reference output reactive power value and an actual output reactive power value of the power converter. It can be understood that a manner of obtaining the reference output reactive current value is simple. This helps improve operation efficiency of the power converter, to improve operation efficiency of the microgrid system.

With reference to the fifth possible implementation of the first aspect or the sixth possible implementation of the first aspect, in a tenth possible implementation, the power converter further obtains the reference output reactive current value based on a reference output voltage and an actual output voltage of the power converter. It can be understood that the reference output reactive current value may alternatively be obtained based on the output voltage of the power converter. The reference output reactive current value can be flexibly obtained in various manners.

With reference to any one of the first aspect to the tenth possible implementation of the first aspect, in an eleventh possible implementation, the power converter further switches from the first voltage source control mode to a second voltage source control mode if the power grid recovers after the power converter is in the first voltage source control mode, where in the second voltage source control mode, the power converter controls an output voltage of the power converter based on a reference voltage amplitude and a reference frequency value. Further, after the power grid recovers, the microgrid system can actively provide preset voltage frequency support and preset voltage amplitude support for the external power grid.

With reference to the eleventh possible implementation of the first aspect, in a twelfth possible implementation, the power converter obtains a fourth reference output modulated voltage value based on the reference voltage amplitude and the reference frequency value, and controls the output voltage of the power converter based on the fourth reference output modulated voltage value, so that the power converter is in the second voltage source control mode.

With reference to any one of the first aspect to the twelfth possible implementation of the first aspect, in a thirteenth possible implementation, when the output voltage of the power converter is less than a voltage threshold or an output current of the power converter is greater than a current threshold, the power converter determines that the power grid fails. It can be understood that the power converter may determine whether the power grid fails based on the output voltage or the output current of the power converter. In this manner, the power converter does not need to communicate with a microgrid controller. This can effectively improve efficiency of performing failure detection on the power grid by the power converter.

With reference to any one of the first aspect to the twelfth possible implementation of the first aspect, in a fourteenth possible implementation, when a voltage of the microgrid bus is less than a voltage threshold, the power converter determines that the power grid fails. It can be understood that the power converter may further determine whether the power grid fails based on the voltage of the microgrid bus. Whether the power grid fails can be flexibly determined in various manners.

With reference to any one of the first aspect to the fourteenth possible implementation of the first aspect, in a fifteenth possible implementation, the microgrid system further includes a microgrid controller, and when detecting that the power grid fails, the microgrid controller controls the grid-tied switch to be turned off after the second duration elapses.

With reference to the fifteenth possible implementation of the first aspect, in a sixteenth possible implementation, the power converter further sends a control mode for the power converter to the microgrid controller after switching to the second voltage source control mode, where in the second voltage source control mode, the power converter controls the output voltage of the power converter based on the reference voltage amplitude and the reference frequency value. The microgrid controller sends a synchronous control instruction to the power converter when the grid-tied switch is in an off state and the received control mode for the power converter is the second voltage source control mode, where the synchronous control instruction is used to control an amplitude difference between an output voltage amplitude of the power converter and a voltage amplitude of the external power grid to be less than an amplitude difference threshold, and a phase difference between an output voltage phase of the power converter and a voltage phase of the external power grid to be less than a phase difference threshold. The microgrid controller controls the grid-tied switch to be turned on when an amplitude difference between a first-end voltage amplitude and a second-end voltage amplitude of the grid-tied switch is less than the amplitude difference threshold and a phase difference between a first-end voltage phase and a second-end voltage phase of the grid-tied switch is less than the phase difference threshold. It can be understood that the microgrid controller adjusts a control mode for each power converter based on an on/off state of the grid-tied switch and the control mode for each power converter, so that each power converter operates in a current source control mode when the microgrid system is in the on-grid mode, and operates in a voltage source control mode when the microgrid system is in an off-grid mode, to improve stability of the microgrid system.

With reference to the sixteenth possible implementation of the first aspect, in a seventeenth possible implementation, when the grid-tied switch is in an on state and the received control mode for the power converter is the second voltage source control mode, the microgrid controller further sends a mode switching instruction to the power converter after third duration elapses, where the mode switching instruction is used to control the power converter to switch to the second current source control mode, and in the second current source control mode, the power converter controls the output voltage of the power converter based on the reference output active current value and the reference output reactive current value. It can be understood that the microgrid controller adjusts a control mode for each power converter based on an on/off state of the grid-tied switch and the control mode for each power converter, so that each power converter operates in a current source control mode when the microgrid system is in the on-grid mode, and operates in a voltage source control mode when the microgrid system is in an off-grid mode, to improve stability of the microgrid system.

According to a second aspect, this disclosure provides a power converter. An input end and an output end of the power converter are connected to a DC power supply and a microgrid bus respectively. The microgrid bus is connected to an external power grid through a grid-tied switch. The power converter is in a first current source control mode when detecting that a power grid fails, and switches from the first current source control mode to a first voltage source control mode after duration of the power grid failure reaches first duration, where the power grid includes the external power grid or a microgrid system in which the microgrid bus is located, the first current source control mode is a current source failure ride-through control mode, the first voltage source control mode is a voltage source failure ride-through control mode, the first duration is less than second duration, and the second duration is a time interval between a moment at which the power grid fails and a moment at which the grid-tied switch is turned off. Further, the power converter controls the power converter to be in a current source failure ride-through control mode when detecting that the power grid fails, and controls the power converter to switch to a voltage source failure ride-through control mode before the grid-tied switch is turned off, so that the power converter provides voltage support for the external power grid when the power grid fails, and completes on-grid/off-grid mode switching before the grid-tied switch is turned off. In this way, the power converter performs both a failure ride-through support function and an on-grid/off-grid switching function.

With reference to the second aspect, in a first possible implementation, in the first current source control mode, the power converter controls an output voltage of the power converter based on a voltage drop value of the microgrid bus in a case in which the power grid fails, to provide reactive current support for the external power grid, and implement a current source failure ride-through support feature of the power converter. In the first voltage source control mode, the power converter controls an output voltage of the power converter based on a maximum preset current amplitude in a preset current amplitude range, to provide voltage and frequency support for the external power grid, and implement a voltage source failure ride-through support feature of the power converter.

With reference to the first possible implementation of the second aspect, in a second possible implementation, the power converter obtains a first reference output current value based on the voltage drop value of the microgrid bus in a case in which the power grid fails, obtains a first reference output modulated voltage value based on the first reference output current value and a first reference angular frequency value, and controls the output voltage of the power converter based on the first reference output modulated voltage value, so that the power converter is in the first current source control mode, and the power converter provides specific voltage support for the external power grid based on the voltage drop value when the power grid fails, to implement the current source failure ride-through support feature of the power converter.

With reference to the first possible implementation of the second aspect or the second possible implementation of the second aspect, in a third possible implementation, the power converter obtains a second reference output current value based on the maximum preset current amplitude and an equivalent impedance angle of the external power grid, obtains a second reference output modulated voltage value based on the second reference output current value and a second reference angular frequency value, and controls the output voltage of the power converter based on the second reference output modulated voltage value, so that the power converter is in the first voltage source control mode. It can be understood that the power converter switches from the current source failure ride-through control mode to the voltage source failure ride-through control mode after the duration of the power grid failure reaches the first duration.

This can reduce a risk of instability of the microgrid system if the power converter does not switch to the voltage source control mode before the grid-tied switch is turned off, and therefore improve stability of the power converter.

With reference to the third possible implementation of the second aspect, in a fourth possible implementation, an initial reference output current value and an initial reference angular frequency value of the power converter in the first voltage source control mode are the first reference output current value and the first reference angular frequency value of the power converter in the first current source control mode at a switching moment respectively. This can reduce a degree of current and voltage fluctuation during mode switching, improve current and voltage smoothness during mode switching, and therefore improve stability of the power converter during mode switching.

With reference to any one of the second aspect to the fourth possible implementation of the second aspect, in a fifth possible implementation, the power converter is further in a second current source control mode before the power grid fails, where in the second current source control mode, the power converter controls an output voltage of the power converter based on a reference output active current value and a reference output reactive current value. It can be understood that, before the power grid fails, the microgrid system is in an on-grid mode, and the power converter is in the second current source control mode, namely, a normal control mode in a current source control mode. This helps improve stability of the power converter.

With reference to the fifth possible implementation of the second aspect, in a sixth possible implementation, the power converter determines the reference output active current value and the reference output reactive current value as a third reference output current value, obtains a third reference output modulated voltage value based on the third reference output current value and a third reference angular frequency value, and controls the output voltage of the power converter based on the third reference output modulated voltage value, so that the power converter is in the second current source control mode.

With reference to the fifth possible implementation of the second aspect or the sixth possible implementation of the second aspect, in a seventh possible implementation, the power converter further obtains the reference output active current value based on a reference output active power value and an actual output active power value of the power converter. It can be understood that a manner of obtaining the reference output active current value is simple. This helps improve operation efficiency of the power converter.

With reference to the fifth possible implementation of the second aspect or the sixth possible implementation of the second aspect, in an eighth possible implementation, the power converter includes a DC/DC circuit, a DC bus, and a DC/AC circuit, and an output end of the DC/DC circuit is connected to an input end of the DC/AC circuit through the DC bus. The power converter further obtains the reference output active current value based on a reference bus voltage and an actual bus voltage of the DC bus. It can be understood that the reference output active current value may alternatively be obtained based on the bus voltage of the DC bus. The reference output active current value can be flexibly obtained in various manners.

With reference to the fifth possible implementation of the second aspect or the sixth possible implementation of the second aspect, in a ninth possible implementation, the power converter further obtains the reference output reactive current value based on a reference output reactive power value and an actual output reactive power value of the power converter. It can be understood that a manner of obtaining the reference output reactive current value is simple. This helps improve operation efficiency of the power converter.

With reference to the fifth possible implementation of the second aspect or the sixth possible implementation of the second aspect, in a tenth possible implementation, the power converter further obtains the reference output reactive current value based on a reference output voltage and an actual output voltage of the power converter. It can be understood that the reference output reactive current value may alternatively be obtained based on the output voltage of the power converter. The reference output reactive current value can be flexibly obtained in various manners.

With reference to any one of the second aspect to the tenth possible implementation of the second aspect, in an eleventh possible implementation, the power converter further switches from the first voltage source control mode to a second voltage source control mode if the power grid recovers after the power converter is in the first voltage source control mode, where in the second voltage source control mode, the power converter controls an output voltage of the power converter based on a reference voltage amplitude and a reference frequency value. Further, after the power grid recovers, the power converter can actively provide preset voltage frequency support and preset voltage amplitude support for the external power grid.

With reference to the eleventh possible implementation of the second aspect, in a twelfth possible implementation, the power converter obtains a fourth reference output modulated voltage value based on the reference voltage amplitude and the reference frequency value, and controls the output voltage of the power converter based on the fourth reference output modulated voltage value, so that the power converter is in the second voltage source control mode.

With reference to any one of the second aspect to the twelfth possible implementation of the second aspect, in a thirteenth possible implementation, when the output voltage of the power converter is less than a voltage threshold or an output current of the power converter is greater than a current threshold, the power converter determines that the power grid fails. It can be understood that the power converter may determine whether the power grid fails based on the output voltage or the output current of the power converter. In this manner, the power converter does not need to communicate with a microgrid controller. This can effectively improve efficiency of performing failure detection on the power grid by the power converter.

With reference to any one of the second aspect to the twelfth possible implementation of the second aspect, in a fourteenth possible implementation, when a voltage of the microgrid bus is less than a voltage threshold, the power converter determines that the power grid fails. It can be understood that the power converter may further determine whether the power grid fails based on the voltage of the microgrid bus. Whether the power grid fails can be flexibly determined in various manners.

According to a third aspect, this disclosure provides a control method for a power converter. An input end and an output end of the power converter are connected to a DC power supply and a microgrid bus respectively. The microgrid bus is connected to an external power grid through a grid-tied switch. The method includes: The power converter is in a first current source control mode when detecting that a power grid fails, and switches from the first current source control mode to a first voltage source control mode after duration of the power grid failure reaches first duration, where the power grid includes the external power grid or a microgrid system in which the microgrid bus is located, the first current source control mode is a current source failure ride-through control mode, the first voltage source control mode is a voltage source failure ride-through control mode, the first duration is less than second duration, and the second duration is a time interval between a moment at which the power grid fails and a moment at which the grid-tied switch is turned off.

With reference to the third aspect, in a first possible implementation, in the first current source control mode, the power converter controls an output voltage of the power converter based on a voltage drop value of the microgrid bus in a case in which the power grid fails. In the first voltage source control mode, the power converter controls an output voltage of the power converter based on a maximum preset current amplitude in a preset current amplitude range.

With reference to the first possible implementation of the third aspect, in a second possible implementation, the power converter obtains a first reference output current value based on the voltage drop value of the microgrid bus in a case in which the power grid fails, obtains a first reference output modulated voltage value based on the first reference output current value and a first reference angular frequency value, and controls the output voltage of the power converter based on the first reference output modulated voltage value, so that the power converter is in the first current source control mode.

With reference to the first possible implementation of the third aspect or the second possible implementation of the third aspect, in a third possible implementation, the power converter obtains a second reference output current value based on the maximum preset current amplitude and an equivalent impedance angle of the external power grid, obtains a second reference output modulated voltage value based on the second reference output current value and a second reference angular frequency value, and controls the output voltage of the power converter based on the second reference output modulated voltage value, so that the power converter is in the first voltage source control mode.

With reference to the third possible implementation of the third aspect, in a fourth possible implementation, an initial reference output current value and an initial reference angular frequency value of the power converter in the first voltage source control mode are the first reference output current value and the first reference angular frequency value of the power converter in the first current source control mode at a switching moment respectively.

With reference to any one of the third aspect to the fourth possible implementation of the third aspect, in a fifth possible implementation, the power converter is further in a second current source control mode before the power grid fails, where in the second current source control mode, the power converter controls an output voltage of the power converter based on a reference output active current value and a reference output reactive current value.

With reference to the fifth possible implementation of the third aspect, in a sixth possible implementation, the power converter determines the reference output active current value and the reference output reactive current value as a third reference output current value, obtains a third reference output modulated voltage value based on the third reference output current value and a third reference angular frequency value, and controls the output voltage of the power converter based on the third reference output modulated voltage value, so that the power converter is in the second current source control mode.

With reference to the fifth possible implementation of the third aspect or the sixth possible implementation of the third aspect, in a seventh possible implementation, the power converter further obtains the reference output active current value based on a reference output active power value and an actual output active power value of the power converter.

With reference to the fifth possible implementation of the third aspect or the sixth possible implementation of the third aspect, in an eighth possible implementation, the power converter includes a DC/DC circuit, a DC bus, and a DC/AC circuit, and an output end of the DC/DC circuit is connected to an input end of the DC/AC circuit through the DC bus. The power converter further obtains the reference output active current value based on a reference bus voltage and an actual bus voltage of the DC bus.

With reference to the fifth possible implementation of the third aspect or the sixth possible implementation of the third aspect, in a ninth possible implementation, the power converter further obtains the reference output reactive current value based on a reference output reactive power value and an actual output reactive power value of the power converter.

With reference to the fifth possible implementation of the third aspect or the sixth possible implementation of the third aspect, in a tenth possible implementation, the power converter further obtains the reference output reactive current value based on a reference output voltage and an actual output voltage of the power converter.

With reference to any one of the third aspect to the tenth possible implementation of the third aspect, in an eleventh possible implementation, the power converter further switches from the first voltage source control mode to a second voltage source control mode if the power grid recovers after the power converter is in the first voltage source control mode, where in the second voltage source control mode, the power converter controls an output voltage of the power converter based on a reference voltage amplitude and a reference frequency value.

With reference to the eleventh possible implementation of the third aspect, in a twelfth possible implementation, the power converter obtains a fourth reference output modulated voltage value based on the reference voltage amplitude and the reference frequency value, and controls the output voltage of the power converter based on the fourth reference output modulated voltage value, so that the power converter is in the second voltage source control mode.

With reference to any one of the third aspect to the twelfth possible implementation of the third aspect, in a thirteenth possible implementation, when the output voltage of the power converter is less than a voltage threshold or an output current of the power converter is greater than a current threshold, the power converter determines that the power grid fails.

With reference to any one of the third aspect to the twelfth possible implementation of the third aspect, in a fourteenth possible implementation, when a voltage of the microgrid bus is less than a voltage threshold, the power converter determines that the power grid fails.

It should be understood that mutual reference may be made between implementations and benefits of the foregoing plurality of aspects of this disclosure.

DESCRIPTION OF EMBODIMENTS

A microgrid system and a power converter provided in this disclosure are applicable to a plurality of application fields such as new energy smart microgrids, power transmission and distribution, new energy (for example, grid-tied photovoltaic energy or grid-tied wind energy), photovoltaic power generation, and wind power generation. The microgrid system and the power converter provided in this disclosure are applicable to different application scenarios, for example, a large industrial and commercial microgrid scenario or a small- and medium-sized distributed microgrid scenario with both on-grid and off-grid functions. The microgrid scenario includes a photovoltaic power supply scenario, a storage power supply scenario, a hybrid photovoltaic-storage power supply scenario, and a hybrid photovoltaic-wind power supply scenario. The following describes the microgrid system by using a small- and medium-sized distributed hybrid photovoltaic-storage power supply scenario as an example.

Figure 1:
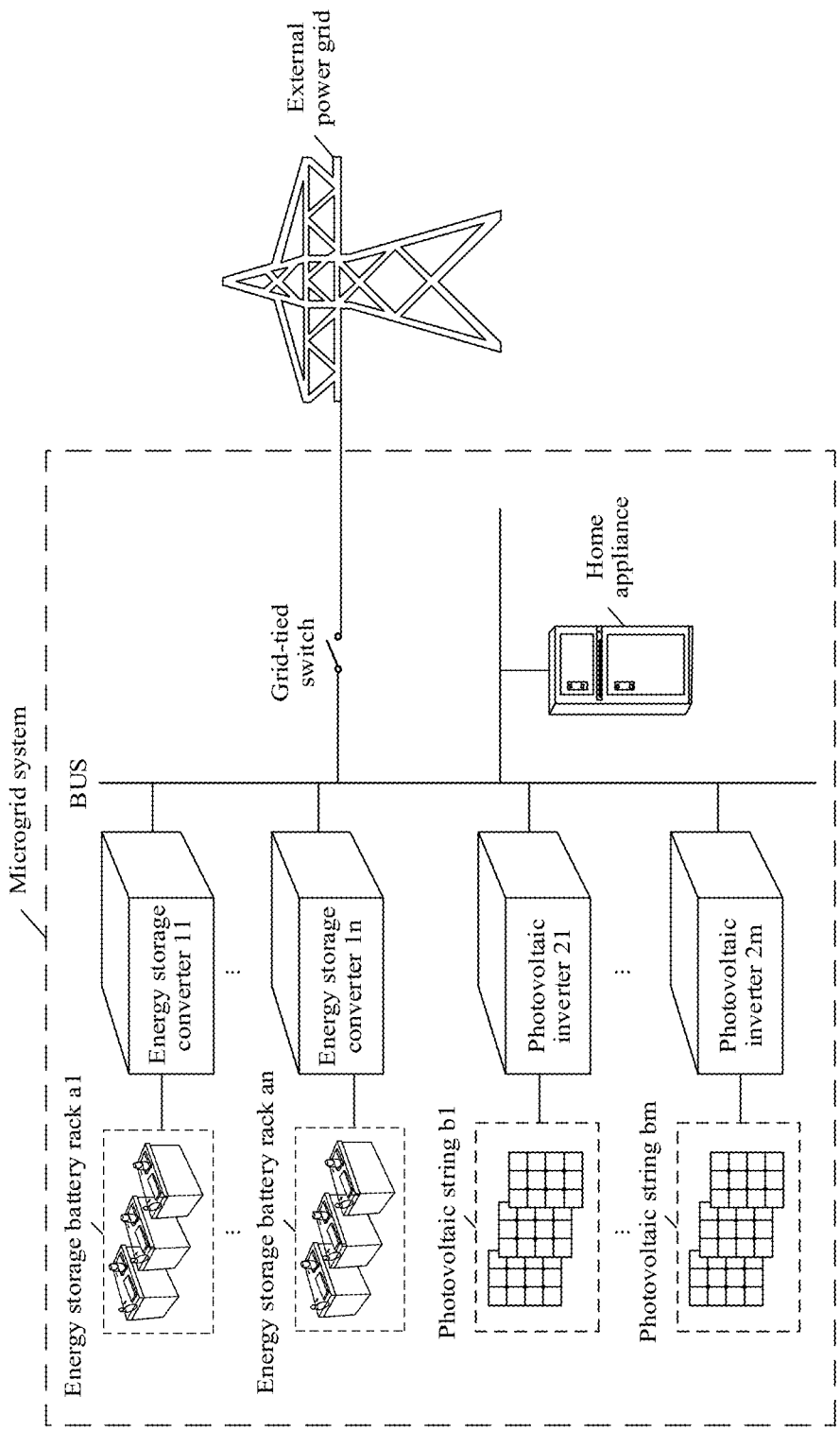
FIG. 1 is a schematic diagram of an application scenario of a microgrid system according to this disclosure.

FIG. 1 is a schematic diagram of an application scenario of a microgrid system according to this disclosure. As shown in FIG. 1, in the small- and medium-sized distributed hybrid photovoltaic-storage power supply scenario, the microgrid system provided in this disclosure may be the microgrid system shown in FIG. 1, and the power converter provided in this disclosure may be an energy storage converter or a photovoltaic inverter shown in FIG. 1. The microgrid system includes an energy storage battery rack a1, . . . , an energy storage battery rack an, a photovoltaic string b1, . . . , a photovoltaic string bm, an energy storage converter 11, . . . , an energy storage converter 1n, a photovoltaic inverter 21, . . . , a photovoltaic inverter 2m, a microgrid bus, a grid-tied switch, and a home appliance. An input end of the energy storage converter 11 is connected to the energy storage battery rack a1, . . . , and an input end of the energy storage converter 1n is connected to the energy storage battery rack an. An output end of the energy storage converter 11, . . . , and an output end of the energy storage converter 1n are all connected to the microgrid bus. An input end of the photovoltaic inverter 21 is connected to the photovoltaic string b1, . . . , and an input end of the photovoltaic inverter 2m is connected to the photovoltaic string bm. An output end of the photovoltaic inverter 21, . . . , and an output end of the photovoltaic inverter 2m are all connected to the microgrid bus. The home appliance is connected to the microgrid bus. The microgrid bus is connected to an external power grid through the grid-tied switch. After the microgrid system is connected to the external power grid and starts to operate, each of the n energy storage converters inverts a DC provided by an energy storage battery rack connected to an input end of the energy storage converter, to obtain an AC, and outputs the AC obtained through inversion to the microgrid bus. Each of the m photovoltaic inverters inverts a DC provided by a photovoltaic string connected to an input end of the photovoltaic inverter, to obtain an AC, and outputs the AC obtained through inversion to the microgrid bus. In this way, power is supplied to the home appliance and the external power grid. In addition, after the microgrid system is connected to the external power grid and starts to operate, the energy storage converters, the photovoltaic inverters, and a microgrid controller detect in real time whether a power grid fails, where the power grid includes the external power grid or the microgrid system. When detecting that the power grid fails, the energy storage converters and the photovoltaic inverters are in a first current source control mode. After duration of the power grid failure reaches first duration, the energy storage converters and the photovoltaic inverters switch from the first current source control mode to a first voltage source control mode, where the first current source control mode is a current source failure ride-through control mode, the first voltage source control mode is a voltage source failure ride-through control mode, the first duration is less than second duration, and the second duration is a time interval between a moment at which the power grid fails and a moment at which the grid-tied switch is turned off. It can be understood that the energy storage converters and the photovoltaic inverters in the microgrid system respectively control the energy storage converters and the photovoltaic inverters to be in the current source failure ride-through control mode when detecting that the power grid fails, and respectively control the energy storage converters and the photovoltaic inverters to switch to the voltage source failure ride-through control mode before the grid-tied switch is turned off, so that the microgrid system provides voltage support for the external power grid when the power grid fails, and completes on-grid/off-grid mode switching before the grid-tied switch is turned off. In this way, the microgrid system performs both a failure ride-through support function and an on-grid/off-grid switching function. The foregoing are merely non-exhaustive examples of application scenarios of the microgrid system provided in this disclosure. An application scenario is not limited in this disclosure.

The following describes operation principles of the microgrid system and the power converter in this disclosure by using examples with reference to FIG. 2A to FIG. 6.

Figure 2A:
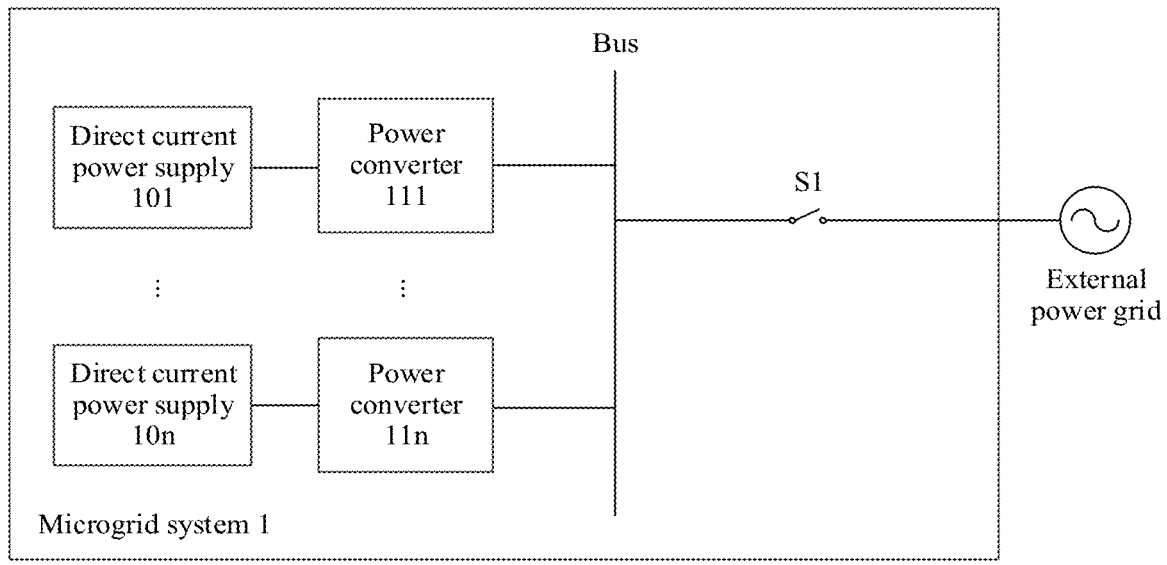
FIG. 2A is a schematic diagram of a structure of a microgrid system according to this disclosure.

FIG. 2A is a schematic diagram of a structure of a microgrid system according to this disclosure. As shown in FIG. 2A, the microgrid system 1 includes a DC power supply 101, . . . , a DC power supply 10n, a power converter 111, . . . , a power converter 11n, a microgrid bus, and a grid-tied switch S1. An input end of the power converter 111 is connected to the DC power supply 101, . . . , and an input end of the power converter 11n is connected to the DC power supply 10n. An output end of the power converter 111, . . . , and an output end of the power converter 11n are all connected in parallel to the microgrid bus. The microgrid bus is connected to an external power grid through the grid-tied switch S1. The power converter in this disclosure may be an energy storage converter, a photovoltaic inverter, an electromechanical converter, or the like.

In an optional implementation, after the microgrid system 1 is connected to the external power grid for operation, each of the power converter 111, . . . , and the power converter 11n starts to detect whether a power grid fails, where the power grid includes the microgrid system 1 or the external power grid. The power converter is in a first current source control mode when detecting that the power grid fails, and switches from the first current source control mode to a first voltage source control mode after duration of the power grid failure reaches first duration, where the first current source control mode is a current source failure ride-through control mode, the first voltage source control mode is a voltage source failure ride-through control mode, the first duration is less than second duration, and the second duration is a time interval between a moment at which the power grid fails and a moment at which the grid-tied switch S1 is turned off.

In this embodiment of this disclosure, the power converter in the microgrid system 1 controls the power converter to be in the current source failure ride-through control mode when detecting that the power grid fails, and controls the power converter to switch to the voltage source failure ride-through control mode before the grid-tied switch is turned off, so that the microgrid system 1 provides voltage support for the external power grid when the power grid fails, and completes on-grid/off-grid mode switching before the grid-tied switch S1 is turned off. In this way, the microgrid system 1 performs both a failure ride-through support function and an on-grid/off-grid switching function.

Figure 2B:
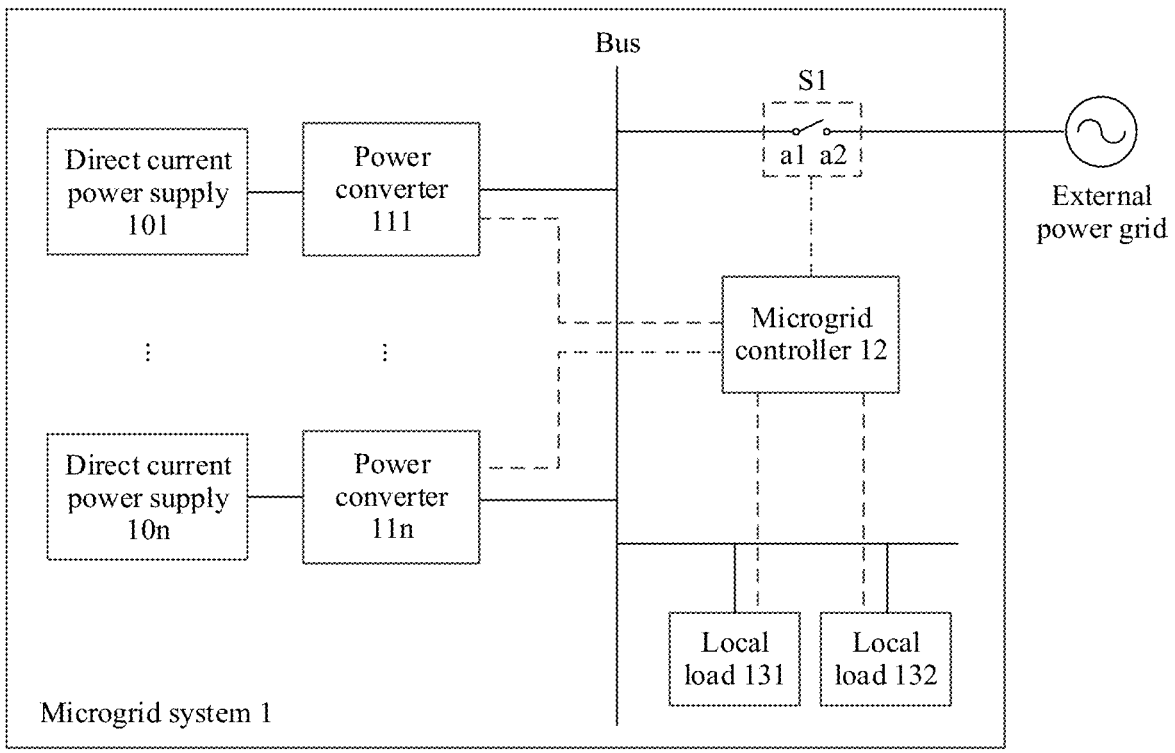
FIG. 2B is a schematic diagram of another structure of a microgrid system according to this disclosure.

FIG. 2B is a schematic diagram of another structure of a microgrid system according to this disclosure. As shown in FIG. 2B, compared with the microgrid system 1 shown in FIG. 2A, the microgrid system 1 shown in FIG. 2B further includes a microgrid controller 12, a local load 131, and a local load 132. Both the local load 131 and the local load 132 are connected to the microgrid bus. A communication line represented by a dashed line in FIG. 2B is provided between the microgrid controller 12 and each of the power converter 111, . . . , the power converter 11n, the grid-tied switch S1, the local load 131, and the local load 132, to establish a communication connection. The local load 131 and the local load 132 are a general load and a critical load respectively. The general load is not always in an on-grid state. When a voltage of the microgrid bus is less than a power supply voltage threshold, the microgrid controller 12 may disconnect the general load from the microgrid system 1, to ensure normal power supply to the critical load.

In an optional implementation, after the microgrid system 1 is connected to the external power grid and starts to operate, the power converters start to detect whether a power grid fails. When the power grid fails, the power converters are in a current source failure ride-through control mode. After duration of the power grid failure reaches first duration, the power converters switch from the current source failure ride-through control mode to a voltage source failure ride-through control mode. In addition, after the microgrid system 1 is connected to the external power grid and starts to operate, the microgrid controller 12 starts to detect whether the power grid fails. When the power grid fails, the microgrid controller 12 controls the grid-tied switch S1 to be turned off after second duration elapses. The second duration is greater than the first duration. In the current source failure ride-through control mode, the power converters control their respective output voltages based on a voltage drop value of the microgrid bus in a case in which the power grid fails. In the voltage source failure ride-through control mode, the power converters control their respective output voltages based on a maximum preset current amplitude in a preset current amplitude range.

The grid-tied switch S1 is in an on state, and the microgrid system 1 is connected to the external power grid for operation. After the microgrid system 1 is connected to the external power grid and starts to operate, the power converters start to obtain their respective output voltages or output currents, and detect whether the power grid fails. In addition, after the microgrid system 1 is connected to the external power grid and starts to operate, the microgrid controller 12 starts to obtain a voltage of the microgrid bus, and detects whether the power grid fails. Operation principles of the power converters in the microgrid system 1 are consistent. Therefore, for ease of description, the power converter 111 is used below as an example for description.

When the output voltage of the power converter is less than a voltage threshold or the output current of the power converter is greater than a current threshold, the power converter 111 determines that the power grid fails. Optionally, when the voltage of the microgrid bus is less than the voltage threshold, the power converter 111 determines that the power grid fails. When determining that the power grid fails, the power converter 111 obtains a first reference output current value based on the voltage drop value of the microgrid bus in a case in which the power grid fails, and obtains a first reference output modulated voltage value based on the first reference output current value and a first reference angular frequency value, to control the output voltage of the power converter based on the first reference output modulated voltage value, so that the power converter 111 is in the current source failure ride-through control mode, namely, a failure ride-through control mode in a current source control mode.

The power converter 111 obtains, based on the voltage drop value of the microgrid bus in a case in which the power grid fails (to be specific, a difference between the voltage threshold and the voltage of the microgrid bus in a case in which the power grid fails), the first reference output current value $I_{ref1}$ corresponding to the voltage drop value by querying a preset correspondence table between a voltage drop value and a first reference output current value. The first reference output current value $I_{ref1}$ includes a first reference output active current value $I_{dref1}$ and a first reference output reactive current value $I_{qref1}$. In the preset correspondence table, a larger voltage drop value of the microgrid bus indicates a larger first reference output current value $I_{ref1}$. Then the power converter 111 inputs the first reference output active current value $I_{dref1}$, the first reference output reactive current value $I_{qref1}$, an actual output active current value $I_d$, and an actual output reactive current value $I_q$ to a current control loop to obtain a first reference q-axis voltage value $V_{qref1}$ and a first reference d-axis voltage value $V_{dref1}$. The current control loop may be any one of a proportional-integral (PI) controller, a proportional-derivative (PD) controller, and a proportional-integral-derivative (PID) controller.

When determining that the power grid fails, the power converter 111 further transforms captured three-phase output voltages $V_a$, $V_b$, and $V_c$ of the power converter 111 from a three-phase stationary coordinate system to a two-phase rotating coordinate system, to be specific, performs abc/dq coordinate transformation on the captured three-phase output voltages $V_a$, $V_b$, and $V_c$ of the power converter 111, to obtain a q-axis voltage component $V_q$, and then inputs the q-axis voltage component $V_q$ to a phase-locked control loop to obtain the first reference angular frequency value $\omega_1$. Then the power converter 111 generates a first reference voltage phase $\theta_1$ based on the first reference angular frequency value $\omega_1$, performs dq/abc coordinate transformation based on the first reference voltage phase $\theta_1$, the first reference q-axis voltage value $V_{qref1}$, and the first reference d-axis voltage value $V_{dref1}$ to obtain the first reference output modulated voltage value, compares the first reference output modulated voltage value with a triangular wave to obtain a first pulse-width modulated wave, and then outputs the first pulse-width modulated wave to a switching transistor of a power conversion circuit (for example, a DC/AC circuit) in the power converter 111, to control an output voltage of the power converter 111, so that the power converter 111 is in the current source failure ride-through control mode. Further, the power converter 111 controls an output reactive current and an output active current of the power converter 111 based on the voltage drop value of the microgrid bus in a case in which the power grid fails, to provide voltage support for the external power grid, and implement a current source failure ride-through support feature.

Then, after the duration of the power grid failure reaches the first duration, the power converter 111 switches from the current source failure ride-through control mode to the voltage source failure ride-through control mode.

In an optional embodiment, the power converter 111 determines a second reference output current value based on an equivalent impedance angle of the external power grid and the maximum preset current amplitude in the preset current amplitude range, and obtains a second reference output modulated voltage value based on the second reference output current value and a second reference angular frequency value, to control an output voltage of the power converter 111 based on the second reference output modulated voltage value, so that the power converter 111 is in the voltage source failure ride-through control mode, namely, a failure ride-through control mode in a voltage source control mode.

After the duration of the power grid failure reaches the first duration, the power converter 111 obtains the equivalent impedance angle of the external power grid, and calculates the second reference output current value $I_{ref2}$ based on the maximum preset current amplitude $I_M$ and the equivalent impedance angle $\sigma$ of the external power grid: a second reference output active current value $I_{dref2}=I_M \times \cos\sigma$, and a second reference output reactive current value $I_{qref2}=I_M \times \sin\sigma$. Then the power converter 111 inputs the second reference output active current value $I_{dref2}$, the second reference output reactive current value $I_{qref2}$, the actual output active current value $I_d$, and the actual output reactive current value $I_q$ to the current control loop to obtain a second reference q-axis voltage value $V_{qref2}$ and a second reference d-axis voltage value $V_{dref2}$.

After the duration of the power grid failure reaches the first duration, the power converter 111 further obtains the second reference angular frequency value $\omega_2$ based on reference output active power $P_{ref}$ and actual output active power P, and generates a second reference voltage phase $\theta_2$ based on the second reference angular frequency value $\omega_2$. Then the power converter 111 performs dq/abc coordinate transformation based on the second reference voltage phase $\theta_2$, the second reference q-axis voltage value $V_{qref2}$, and the second reference d-axis voltage value $V_{dref2}$ to obtain the second reference output modulated voltage value, compares the second reference output modulated voltage value with the triangular wave to obtain a second pulse-width modulated wave, and then outputs the second pulse-width modulated wave to the switching transistor of the power conversion circuit in the power converter 111, to control the output voltage of the power converter 111, so that the power converter 111 switches from the current source failure ride-through control mode to the voltage source failure ride-through control mode. Further, in the voltage source failure ride-through control mode, the power converter 111 distributes an active current and a reactive current based on the maximum preset current amplitude, to provide voltage and frequency support for the external power grid, and implement a voltage source failure ride-through support feature.

Then, when the microgrid controller 12 detects that the power grid fails (to be specific, when it is detected that the voltage of the microgrid bus is less than the voltage threshold), the microgrid controller 12 controls the grid-tied switch S1 to be turned off after the second duration elapses.

It can be understood that, because the first duration is less than the second duration, it can be ensured that each power converter in the microgrid system 1 completes switching from the failure ride-through control mode in the current source control mode to the failure ride-through control mode in the voltage source control mode before the grid-tied switch S1 is turned off. In this way, the microgrid system 1 performs both an on-grid/off-grid switching function and a failure ride-through support function during failure ride-through (to be specific, in a time period between a moment at which the power grid fails and a moment at which the grid-tied switch S1 is turned off). In addition, dependence on communication delay performance is significantly reduced, and the power converter is prevented from injecting a disturbance signal into the external power grid to detect an off-grid state. This resolves instability of the microgrid system 1 caused by a large mode switching delay of the power converter (to be specific, some power converters do not switch to the voltage source control mode before the grid-tied switch S1 is turned off), and therefore improves stability and market competitiveness of the microgrid system 1.

Further, because current disturbance occurs when the power converter directly switches from the current source failure ride-through control mode to the voltage source failure ride-through control mode, to reduce a degree of fluctuation of an output current and an output voltage of the power converter during mode switching and improve smoothness of the output current and the output voltage during mode switching, this may be implemented by setting an initial reference output current value and an initial reference angular frequency value of the power converter in the voltage source failure ride-through control mode to the first reference output current value and the first reference angular frequency value of the power converter in the current source failure ride-through control mode at a switching moment respectively.

After the duration of the power grid failure reaches the first duration, the power converter 111 uses the first reference output current value $I_{ref1}$ and the first reference angular frequency value $\omega_1$ of the power converter 111 in the current source failure ride-through control mode in a case in which the duration of the power grid failure is the first duration as an initial reference output current value $I_{ref20}$ and an initial reference angular frequency value $\omega_{20}$ of the power converter 111 in the voltage source failure ride-through control mode. The initial reference output current value $I_{ref20}$ includes an initial reference output active current value $I_{dref20}$ and an initial reference output reactive current value $I_{qref20}$. Then the power converter 111 inputs the initial reference output active current value $I_{dref20}$, the initial reference output reactive current value $I_{qref2}$, the actual output active current value $I_d$, and the actual output reactive current value $I_q$ to the current control loop to obtain the second reference q-axis voltage value $V_{qref2}$ and the second reference d-axis voltage value $V_{dref2}$. The power converter 111 generates the second reference voltage phase 62 based on the initial reference angular frequency value. Then the power converter 111 performs dq/abc coordinate transformation based on the second reference voltage phase $\theta_2$, the second reference q-axis voltage value $V_{qref2}$, and the second reference d-axis voltage value $V_{dref2}$ to obtain the second reference output modulated voltage value, compares the second reference output modulated voltage value with the triangular wave to obtain the second pulse-width modulated wave, and then outputs the second pulse-width modulated wave to the switching transistor of the power conversion circuit in the power converter 111, to control the output voltage of the power converter 111, so that the power converter 111 is in the voltage source failure ride-through control mode and completes switching from the current source failure ride-through control mode to the voltage source failure ride-through control mode.

It should be noted that, after the power converter 111 switches from the current source failure ride-through control mode to the voltage source failure ride-through control mode based on the initial reference output current value $I_{ref20}$ and the initial reference angular frequency value $\omega_{20}$, the power converter 111 may continuously control an output voltage of the power converter 111 based on the second reference output voltage values determined based on the initial reference output current value $I_{ref20}$ and the initial reference angular frequency value $\omega_{20}$, so that the power converter 111 remains in the voltage source failure ride-through control mode. Alternatively, after the power converter 111 switches from the current source failure ride-through control mode to the voltage source failure ride-through control mode based on the initial reference output current value $I_{ref20}$ and the initial reference angular frequency value $\omega_{20}$, the power converter 111 may alternatively control an output voltage of the power converter 111 based on the second reference angular frequency value and the second reference output current value determined based on the maximum preset current amplitude and the equivalent impedance angle of the external power grid, so that the power converter 111 remains in the voltage source failure ride-through control mode.

After the microgrid system 1 is connected to the external power grid and starts to operate, the power converter 111 is further in a second current source control mode, namely, a normal control mode in the current source control mode, before detecting that the power grid fails. In the second current source control mode, the power converter 111 controls an output voltage of the power converter 111 based on a reference output active current value and a reference output reactive current value. For example, the second current source control mode may be an active power P control mode or a reactive power Q control mode.

In an optional embodiment, the power converter 111 obtains an actual output active power value of the power converter 111, and inputs the actual output active power value and a reference active power value of the power converter 111 to an active/reactive power control loop to obtain the reference output active current value.

In another optional embodiment, the power converter 111 includes a DC/DC circuit, a DC bus, and a DC/AC circuit, where an input end of the DC/DC circuit is connected to an input end of the power converter, an output end of the DC/DC circuit is connected to an input end of the DC/AC circuit through the DC bus, and an output end of the DC/AC circuit is connected to an output end of the power converter 111. The power converter 111 obtains an actual bus voltage of the DC bus, and inputs the actual bus voltage of the DC bus and a reference bus voltage to a voltage control loop to obtain the reference output active current value.

In an optional embodiment, the power converter 111 further obtains an actual output reactive power value of the power converter 111, and inputs a reference output reactive power value and the actual output reactive power value of the power converter 111 to the active/reactive power control loop to obtain the reference output reactive current value.

In another optional embodiment, the power converter further obtains an actual output voltage of the power converter, and inputs a reference output voltage and the actual output voltage of the power converter to the voltage control loop to obtain the reference output reactive current value.

The active/reactive power control loop and the voltage control loop in the foregoing embodiments may be any one of a PI controller, a PD controller, and a PID controller.

The power converter 111 may obtain the reference output active current value and the reference output reactive current value based on any combination of any one of the foregoing embodiments of obtaining the reference output active current value and any one of the foregoing embodiments of obtaining the reference output reactive current value. The power converter 111 determines the reference output active current value and the reference output reactive current value as a third reference output current value, and obtains a third reference output modulated voltage value based on the third reference output current value and a third reference angular frequency value, to control the output voltage of the power converter 111 based on the third reference output modulated voltage value, so that the power converter 111 is in the second current source control mode.

For ease of description, that the power converter 111 is in the second current source control mode is described below by using an example in which the reference output active current value and the reference output reactive current value are determined based on the reference output active power value and the reference output reactive power value respectively.

The power converter 111 obtains the actual output active power value P and the actual output reactive power value Q of the power converter 111, and inputs the reference output active power value $P_{ref}$, the reference output reactive power value $Q_{ref}$, the actual output active power value P, and the actual output reactive power value Q of the power converter 111 to the active/reactive power control loop to obtain a third reference output active current value $I_{dref3}$ and a third reference output reactive current value $I_{qref3}$. Then the power converter 111 inputs the third reference output active current value $I_{dref3}$, the third reference output reactive current value $I_{qref3}$, the actual output active current value $I_d$, and the actual output reactive current value $I_q$ to the current control loop to obtain a third reference q-axis voltage value $V_{qref3}$ and a third reference d-axis voltage value $V_{dref3}$. The power converter 111 further performs abc/dq coordinate transformation on the captured three-phase output voltages $V_a$, $V_b$, and $V_c$ of the power converter 111 to obtain the q-axis voltage component $V_q$, and then inputs the q-axis voltage component $V_q$ to the phase-locked control loop to obtain the third reference angular frequency value $\omega_3$. Then the power converter 111 generates a third reference voltage phase $\theta_3$ based on the third reference angular frequency value $\omega_3$, performs dq/abc coordinate transformation based on the third reference voltage phase $\theta_3$, the third reference q-axis voltage value $V_{qref3}$, and the third reference d-axis voltage value $V_{dref3}$ to obtain the third reference output modulated voltage value, compares the third reference output modulated voltage value with the triangular wave to obtain a third pulse-width modulated wave, and then outputs the third pulse-width modulated wave to the switching transistor of the power conversion circuit in the power converter 111, to control the output voltage of the power converter 111, so that the power converter 111 is in the second current source control mode.

In addition, if the power grid recovers after the power converter 111 is in the voltage source failure ride-through control mode, the power converter 111 switches from the voltage source failure ride-through control mode to a second voltage source control mode (a normal control mode in the voltage source control mode), where in the second voltage source control mode, the power converter 111 controls an output voltage of the power converter 111 based on a reference voltage amplitude and a reference frequency value. On the contrary, if the power grid failure persists after the power converter 111 is in the voltage source failure ride-through control mode, the power converter 111 remains in the voltage source failure ride-through control mode. For example, the second voltage source control mode may be in a virtual synchronous generator (VSG) control mode.

In an optional embodiment, the power converter 111 obtains a fourth reference output modulated voltage value based on the reference voltage amplitude and the reference frequency value, and controls the output voltage of the power converter 111 based on the fourth reference output modulated voltage value, so that the power converter 111 switches to the second voltage source control mode.

After obtaining the fourth reference output modulated voltage value based on the reference voltage amplitude and the reference frequency value, the power converter 111 compares the fourth reference output modulated voltage value with the triangular wave to obtain a fourth pulse-width modulated wave, and then outputs the fourth pulse-width modulated wave to the switching transistor of the power conversion circuit in the power converter 111, to control the output voltage of the power converter 111, so that the power converter 111 is in the second voltage source control mode and completes mode switching from the voltage source failure ride-through control mode to the second voltage source control mode.

After switching to the second voltage source control mode, the power converter 111 sends a control mode for the power converter 111 to the microgrid controller 12, and the microgrid controller 12 receives a control mode sent by each power converter, and detects an on/off state of the grid-tied switch S1.

In an optional embodiment, when the control mode for the power converter 111 is the second voltage source control mode and the grid-tied switch S1 is in an off state, the microgrid controller 12 sends a synchronous control instruction to the power converter 111. The power converter 111 controls, according to the received synchronous control instruction, an amplitude difference between an output voltage amplitude of the power converter 111 and a voltage amplitude of the external power grid to be less than an amplitude difference threshold, and a phase difference between an output voltage phase of the power converter 111 and a voltage phase of the external power grid to be less than a phase difference threshold, so that the output voltage of the power converter 111 is synchronized with a voltage of the external power grid. Then the microgrid controller 12 controls the grid-tied switch S1 to be turned on when an amplitude difference between a first-end voltage amplitude (to be specific, a voltage amplitude at a first end a1) and a second-end voltage amplitude (to be specific, a voltage amplitude at a second end a2) of the grid-tied switch S1 is less than the amplitude difference threshold, and a phase difference between a first-end voltage phase (to be specific, a voltage phase at the first end a1) and a second-end voltage phase (to be specific, a voltage phase at the second end a2) of the grid-tied switch S1 is less than the phase difference threshold.

In another optional embodiment, when the control mode for the power converter 111 is the second voltage source control mode and the grid-tied switch S1 is in an on state, the microgrid controller 12 sends a mode switching instruction to the power converter 111 after third duration elapses. The power converter 111 switches from the second voltage source control mode to the second current source control mode according to the received mode switching instruction.

It can be understood that the microgrid controller 12 adjusts a control mode for each power converter based on an on/off state of the grid-tied switch S1 and the control mode for each power converter, so that each power converter operates in a current source control mode when the microgrid system 1 is in an on-grid mode, and operates in a voltage source control mode when the microgrid system 1 is in an off-grid mode, to improve stability of the microgrid system 1.

Figure 3:
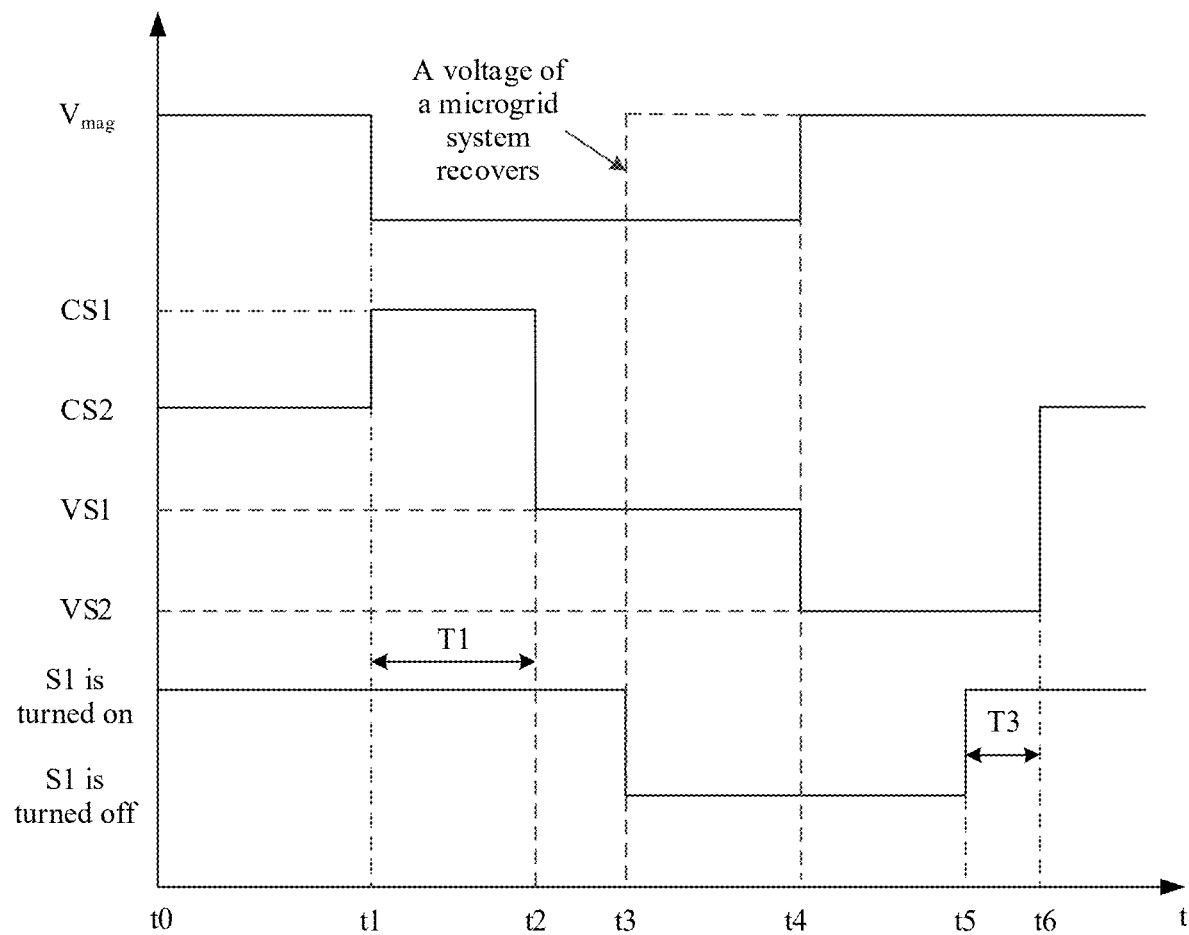
FIG. 3 is a schematic diagram of control timing of a microgrid system according to this disclosure.

Further, for ease of understanding, FIG. 3 is a schematic diagram of control timing of a microgrid system according to this disclosure. As shown in FIG. 3, at a moment t0 to a moment t1, a grid voltage $V_{mag}$ of the external power grid does not drop, in other words, the external power grid does not fail. In addition, in a time period corresponding to the moment t0 to the moment t1, the grid-tied switch S1 is in an on state, and the power converter 111 is in a second current source control mode CS2.

At the moment t1, the grid voltage $V_{mag}$ of the external power grid drops, in other words, the external power grid fails, and the power converter 111 switches from the second current source control mode CS2 to a first current source control mode CS1. In addition, at the moment t1, the grid-tied switch S1 is still in the on state.

At the moment t1 to a moment t2, the grid voltage $V_{mag}$ of the external power grid does not recover, the failure of the external power grid persists, and the power converter 111 is in the first current source control mode CS1. In addition, in a time period corresponding to the moment t1 to the moment t2, the grid-tied switch S1 is still in the on state.

At the moment t2, to be specific, a moment later than the moment t1 by first duration T1, the failure of the external power grid persists, and the power converter 111 switches from the first current source control mode CS1 to a first voltage source control mode VS1. In addition, at the moment t2, the grid-tied switch S1 is still in the on state.

At the moment t2 to a moment t3, the failure of the external power grid persists, the power converter 111 is in the first voltage source control mode VS1, and the grid-tied switch S1 is still in the on state.

At the moment t3, the microgrid controller 12 controls the grid-tied switch S1 to be turned off, a voltage of the microgrid system 1 recovers, and the power converter 111 is still in the first voltage source control mode VS1.

At the moment t3 to a moment t4, the failure of the external power grid persists, the power converter 111 is still in the first voltage source control mode VS1, and the grid-tied switch S1 is in an off state.

At the moment t4, the grid voltage $V_{mag}$ of the external power grid recovers, the external power grid recovers, and the power converter 111 switches from the first voltage source control mode VS1 to a second voltage source control mode VS2. In addition, at the moment t4, the grid-tied switch S1 is in the off state.

At the moment t4 to a moment t5, the external power grid is normal, and the power converter 111 is in the second voltage source control mode VS2, and controls an output voltage of the power converter 111 according to a synchronous control instruction sent by the microgrid controller 12. In addition, in a time period corresponding to the moment t4 to the moment t5, the grid-tied switch S1 is in the off state.

At the moment t5, the external power grid is normal, and the power converter 111 is in the second voltage source control mode VS2. The microgrid controller 12 controls the grid-tied switch S1 to be turned on, and determines an on/off state of the grid-tied switch S1 and a control mode for the power converter 111.

At the moment t5 to a moment t6, the external power grid is normal, the power converter III is still in the second voltage source control mode VS2, and the grid-tied switch S1 is in the on state.

At the moment t6, to be specific, a moment later, by third duration T3, than the moment t2 at which the microgrid controller 12 determines that the grid-tied switch S1 is turned on and the control mode for the power converter III is the second voltage source control mode VS2, the external power grid is normal, and the power converter III switches from the second voltage source control mode VS2 to the second current source control mode CS2 according to a mode switching instruction sent by the microgrid controller 12. In addition, at the moment t6, the grid-tied switch S1 is in the on state.

In this embodiment of this disclosure, the microgrid system 1 uses an on-grid/off-grid switching control mode with "a bottom-up means as a primary means and a top-down means as a secondary means". To be specific, in the on-grid/off-grid switching control mode, during a power grid failure, each power converter in the microgrid system 1 first determines whether a power grid fails, and then performs control mode switching, and then the microgrid controller 12 additionally sends a mode control instruction to each power converter based on an on/off state of the grid-tied switch S1 and a control mode for each power converter, so that each power converter performs both an on-grid/off-grid switching function and a failure ride-through support function during failure ride-through. In addition, dependence on communication delay performance is significantly reduced, and the power converter is prevented from injecting a disturbance signal into the external power grid to detect an off-grid state. This resolves instability of the microgrid system 1 caused by a large switching delay of the power converter, and therefore improves stability and market competitiveness of the microgrid system 1. In addition, the on-grid/off-grid switching control mode provided in this embodiment of this disclosure has a low requirement on a communication delay between the microgrid controller 12 and each power converter. A large communication delay does not cause instability of the microgrid system 1, so that delay robustness is good.

It should be noted that, in this disclosure, in addition to the microgrid controller 12, a controller included in the grid-tied switch S1 may directly control the grid-tied switch S1 to be turned on or turned off. Herein, control logic of controlling, by the controller of the grid-tied switch S1, the grid-tied switch S1 to be turned off or turned on is consistent with control logic of controlling, by the microgrid controller 12, the grid-tied switch S1 to be turned off or turned on. Details are not described herein again.

Figure 4:
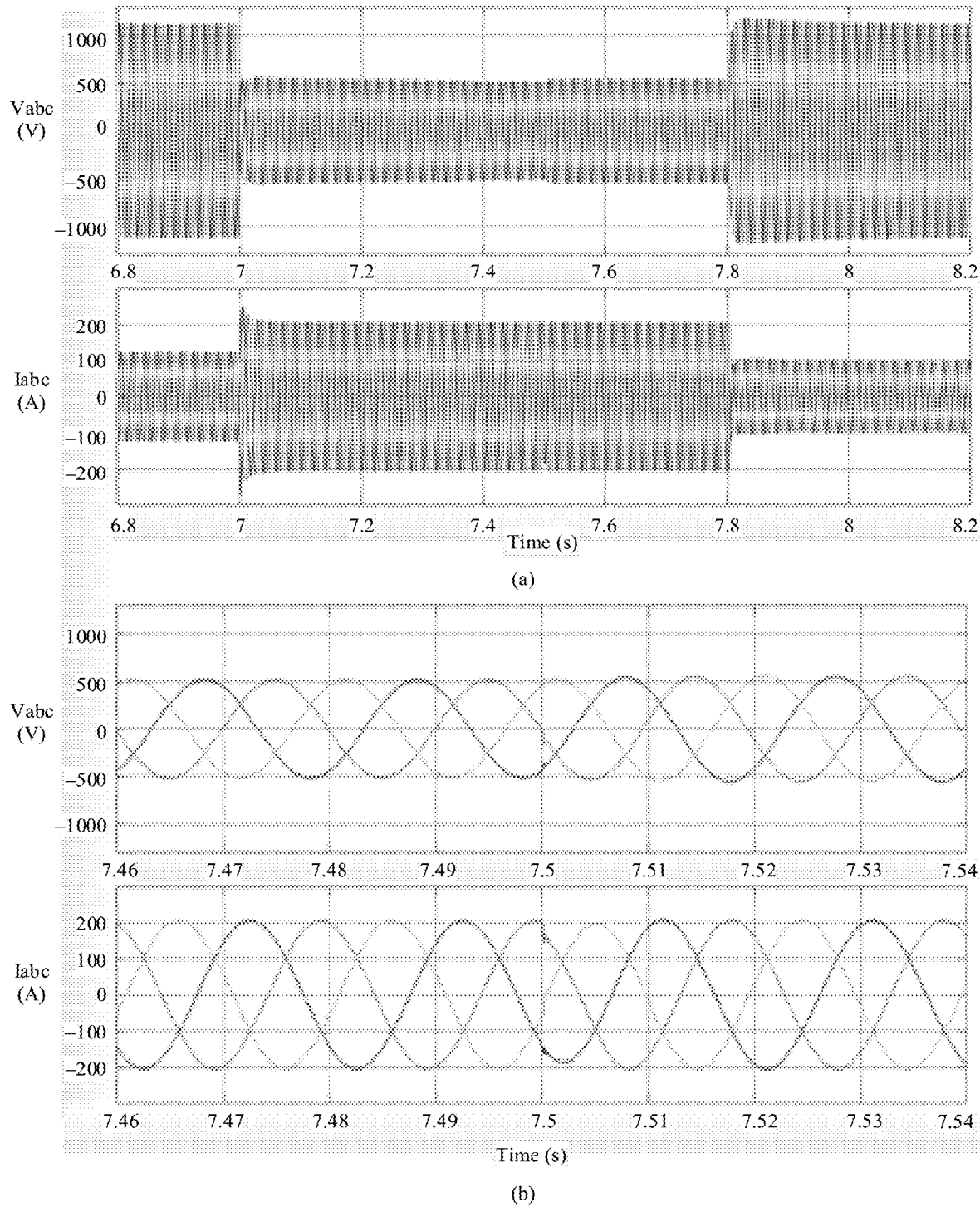
FIG. 4 is a schematic diagram of simulation for a microgrid system according to this disclosure.
Figure 5:
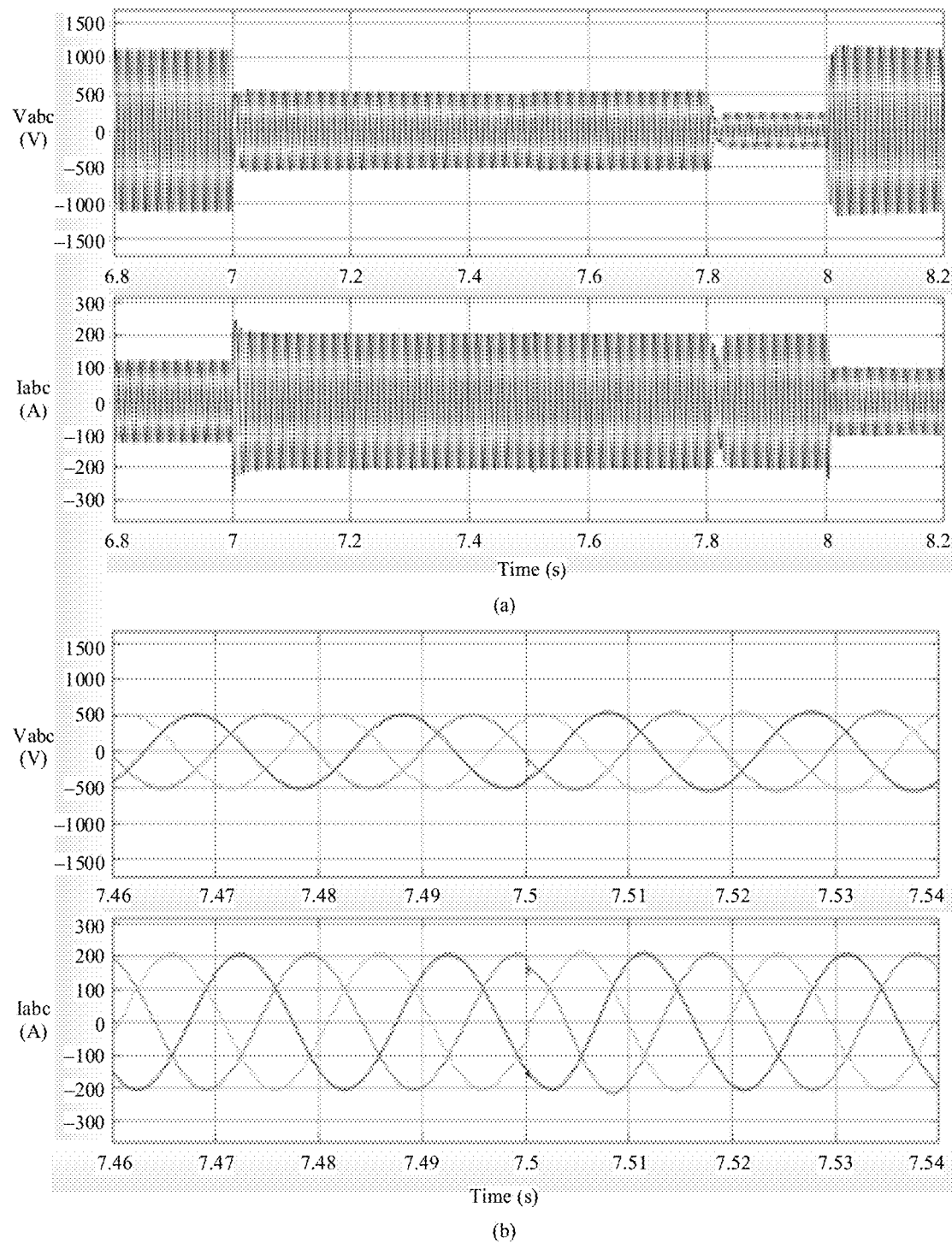
FIG. 5 is another schematic diagram of simulation for a microgrid system according to this disclosure.
Figure 6:
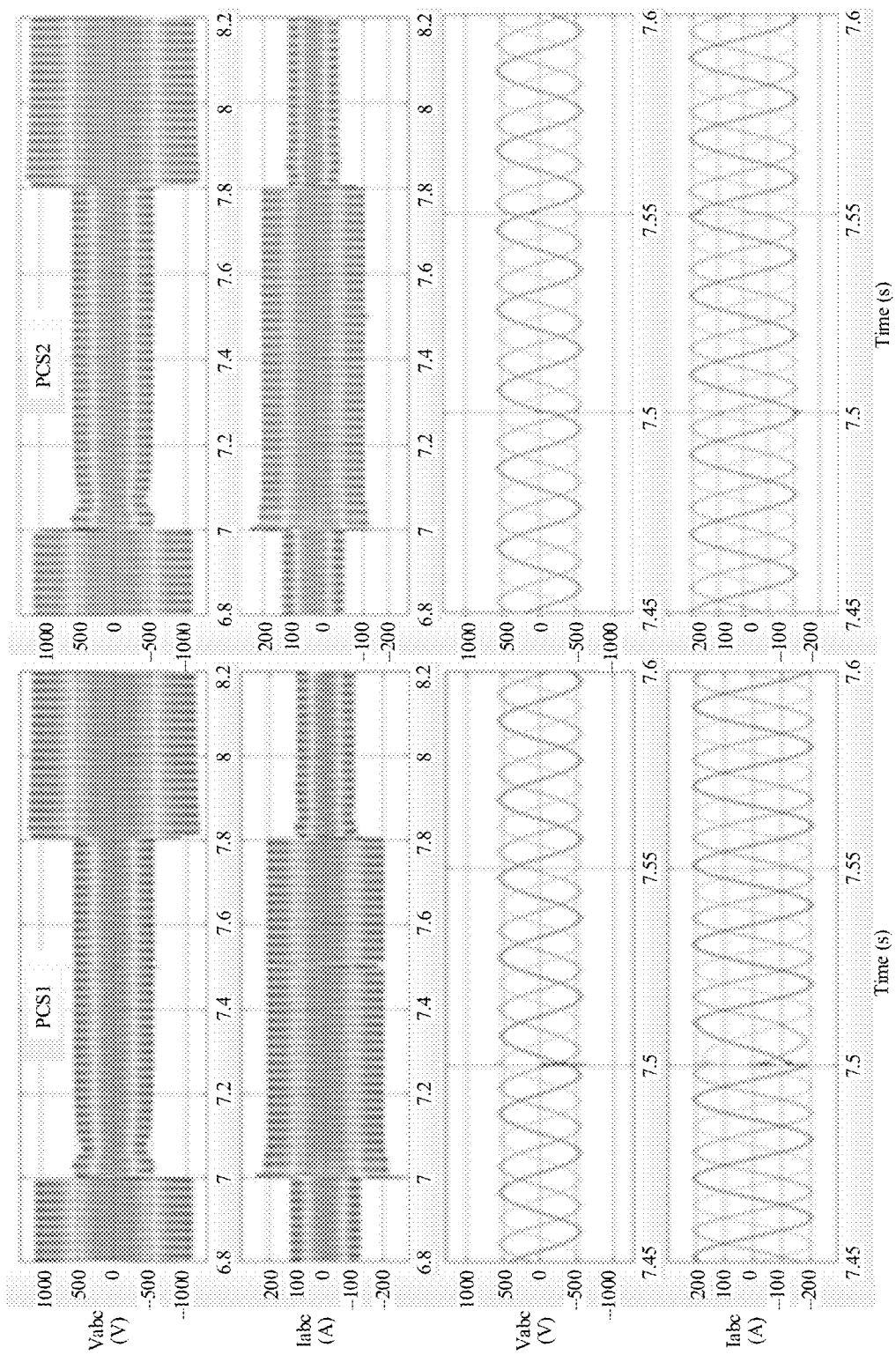
FIG. 6 is still another schematic diagram of simulation for a microgrid system according to this disclosure.

With reference to FIG. 4 to FIG. 6, an example in which the power converter is an energy storage converter is used below to verify that the microgrid system provided in this disclosure performs both an on-grid/off-grid switching function and a failure ride-through support function during failure ride-through.

FIG. 4 is a schematic diagram of simulation for a microgrid system according to this disclosure. As shown in FIG. 4, an upper curve and a lower curve in (a) in FIG. 4 represent a three-phase output voltage Vabc and a three-phase output current Iabc of each energy storage converter respectively, and (b) in FIG. 4 is a schematic enlarged view of a curve corresponding to a time period of 7.46 seconds (s) to 7.54 s in (a) in FIG. 4.

As shown in FIG. 4, when operation time does not reach 7 s, each energy storage converter is connected to the external power grid in a normal control mode in a current source control mode. When operation time is 7 s, a three-phase grounding failure occurs in the external power grid. When operation time ranges from 7 s to 7.5 s, each energy storage converter performs failure ride-through in the current source control mode. To be specific, each energy storage converter is in a current source failure ride-through control mode. When operation time is 7.5 s, each energy storage converter switches from the current source control mode to a voltage source control mode. Each energy storage converter switches from the current source failure ride-through control mode to a voltage source failure ride-through control mode. When operation time ranges from 7.5 s to 7.8 s, each energy storage converter performs failure ride-through in the voltage source control mode. To be specific, each energy storage converter is in a voltage source failure ride-through control mode. When operation time is 7.8 s, the grid-tied switch is turned off, the microgrid system and the external power grid recover, and each energy storage converter operates in an off-grid mode. When operation time is greater than 7.8 s, each energy storage converter independently operates with a load in a normal control mode in the voltage source control mode.

It can be learned from FIG. 4 that, in the microgrid system provided in this disclosure, each energy storage converter may switch from a first current source control mode to a first voltage source control mode during failure ride-through during which the external power grid fails, and perform both a failure ride-through support function and an on-grid/off-grid switching function.

FIG. 5 is another schematic diagram of simulation for a microgrid system according to this disclosure. As shown in FIG. 5, an upper curve and a lower curve in (a) in FIG. 5 represent a three-phase output voltage Vabc and a three-phase output current Iabc of each energy storage converter respectively, and (b) in FIG. 5 is a schematic enlarged view of a curve corresponding to a time period of 7.46 s to 7.54 s in (a) in FIG. 5.

As shown in FIG. 5, when operation time does not reach 7 s, each energy storage converter is connected to the external power grid in a normal control mode in a current source control mode. When operation time is 7 s, a three-phase grounding failure occurs at a point in the microgrid system. When operation time ranges from 7 s to 7.5 s, each energy storage converter performs failure ride-through in the current source control mode. To be specific, each energy storage converter is in a current source failure ride-through control mode. When operation time is 7.5 s, each energy storage converter switches from the current source control mode to a voltage source control mode. Each energy storage converter switches from the current source failure ride-through control mode to a voltage source failure ride-through control mode. When operation time ranges from 7.5 s to 7.8 s, each energy storage converter performs failure ride-through in the voltage source control mode. To be specific, each energy storage converter is in a voltage source failure ride-through control mode. When operation time is 7.8 s, the grid-tied switch is turned off, and each energy storage converter operates in an off-grid mode. When operation time ranges from 7.8 s to 8 s, two energy storage converters continue to perform failure ride-through in the voltage source control mode. When operation time is 8 s, the failure is removed, and a voltage of the microgrid system recovers. When operation time is greater than 8 s, each energy storage converter independently operates with a load in a normal control mode in the voltage source control mode.

It can be learned from FIG. 5 that, in the microgrid system provided in this disclosure, each energy storage converter may still switch from a first current source control mode to a first voltage source control mode during failure ride-through during which the microgrid system fails, and perform both a failure ride-through support function and an on-grid/off-grid switching function.

FIG. 6 is still another schematic diagram of simulation for a microgrid system according to this disclosure. As shown in FIG. 6, two curves in an upper left part of FIG. 6 represent a three-phase output voltage Vabc and a three-phase output current Iabc of an energy storage converter PCS1 respectively, and two curves in a lower left part are schematic enlarged views of curves corresponding to a time period of 7.45 s to 7.6 s of the two curves in the upper left part of FIG. 6 respectively. Two curves in an upper right part of FIG. 6 represent a three-phase output voltage Vabc and a three-phase output current Iabc of an energy storage converter PCS2 respectively, and two curves in a lower right part are schematic enlarged views of curves corresponding to a time period of 7.45 s to 7.6 s of the two curves in the upper right part of FIG. 6 respectively.

As shown in FIG. 6, when operation time does not reach 7 s, each energy storage converter is connected to the external power grid in a normal control mode in a current source control mode. When operation time is 7 s, a three-phase grounding failure occurs in the external power grid. When operation time ranges from 7 s to 7.5 s, each energy storage converter performs failure ride-through in the current source control mode. To be specific, each energy storage converter is in a current source failure ride-through control mode. When operation time is 7.5 s, the energy storage converter PCS1 switches from the current source control mode to a voltage source control mode. Each energy storage converter switches from the current source failure ride-through control mode to a voltage source failure ride-through control mode. When operation time ranges from 7.5 s to 7.55 s, the energy storage converter PCS1 performs failure ride-through in the voltage source control mode, and the energy storage converter PCS2 performs failure ride-through in the current source control mode. When operation time is 7.55 s, the energy storage converter PCS2 switches from the current source failure ride-through control mode to the voltage source failure ride-through control mode. When operation time ranges from 7.55 s to 7.8 s, both the energy storage converters PCS1 and PCS2 perform failure ride-through in the voltage source control mode. When operation time is 7.8 s, the grid-tied switch is turned off, the failure is removed, and each energy storage converter operates in an off-grid mode. When operation time is greater than 7.8 s, each energy storage converter independently operates with a load in a normal operation mode in the voltage source control mode.

It can be learned from FIG. 6 that stability of the microgrid system is not affected even if the energy storage converters in the microgrid system provided in this disclosure switch from a first current source control mode to a first voltage source control mode at different time during failure ride-through.

Figure 7:
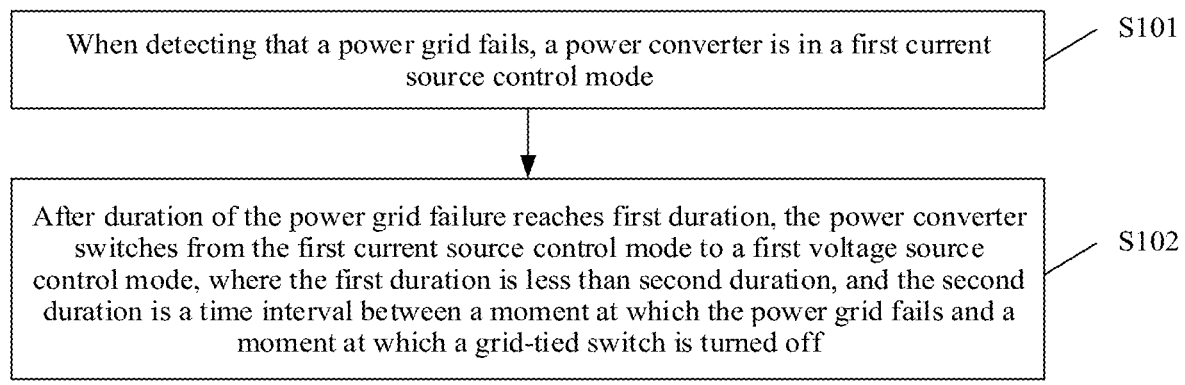
FIG. 7 is a schematic flowchart of a control method for a power converter according to this disclosure.

FIG. 7 is a schematic flowchart of a control method for a power converter according to this disclosure. The control method for a power converter in this embodiment of this disclosure is applicable to the power converters in the microgrid system 1 shown in FIG. 2A and FIG. 2B. The control method for a power converter may include the following steps.

S101: When detecting that a power grid fails, a power converter is in a first current source control mode.

The power grid includes an external power grid or a microgrid system. The first current source control mode is a current source failure ride-through control mode.

In an optional implementation, in the first current source control mode, the power converter controls an output voltage of the power converter based on a voltage drop value of a microgrid bus in a case in which the power grid fails.

When the output voltage of the power converter is less than a voltage threshold or an output current of the power converter is greater than a current threshold, the power converter obtains a first reference output current value based on the voltage drop value of the microgrid bus in a case in which the power grid fails, and obtains a first reference output modulated voltage value based on the first reference output current value and a first reference angular frequency value, to control the output voltage of the power converter based on the first reference output modulated voltage value, so that the power converter is in the first current source control mode.

S102: After duration of the power grid failure reaches first duration, the power converter switches from the first current source control mode to a first voltage source control mode, where the first duration is less than second duration, and the second duration is a time interval between a moment at which the power grid fails and a moment at which a grid-tied switch is turned off.

The first voltage source control mode is a voltage source failure ride-through control mode.

In an optional implementation, in the first voltage source control mode, the power converter controls an output voltage of the power converter based on a maximum preset current amplitude in a preset current amplitude range.

In an optional embodiment, after the duration of the power grid failure reaches the first duration, the power converter determines a second reference output current value based on the maximum preset current amplitude and an equivalent impedance angle of the external power grid, obtains a second reference output modulated voltage value based on the second reference output current value and a second reference angular frequency value, and controls the output voltage of the power converter based on the second reference output modulated voltage value, so that the power converter is in the first voltage source control mode and completes mode switching from the first current source control mode to the first voltage source control mode.

In another optional implementation, after the duration of the power grid failure reaches the first duration, the power converter determines, as an initial reference output current value and an initial reference angular frequency value of the power converter in the first voltage source control mode respectively, the first reference output current value and the first reference angular frequency value of the power converter in the first current source control mode at a switching moment at which the power converter switches from the first current source control mode to the first voltage source control mode; and obtains the second reference output modulated voltage value based on the initial reference output current value and the initial reference angular frequency value, to control the output voltage of the power converter based on the second reference output modulated voltage value, so that the power converter switches from the first current source control mode to the first voltage source control mode.

During specific implementation, for more operations performed by the power converter in the control method for a power converter in this disclosure, refer to implementations performed by the power converters in the microgrid system 1 shown in FIG. 2A and FIG. 2B. Details are not described herein again.

In this embodiment of this disclosure, when the power grid fails, the power converter controls the power converter to be in the current source failure ride-through control mode when detecting that the power grid fails, and controls the power converter to switch to the voltage source failure ride-through control mode before the grid-tied switch is turned off, so that the power converter provides voltage support for the external power grid when the power grid fails, and completes on-grid/off-grid mode switching before the grid-tied switch is turned off. In this way, the power converter performs both a failure ride-through support function and an on-grid/off-grid switching function.

Figure 8A:
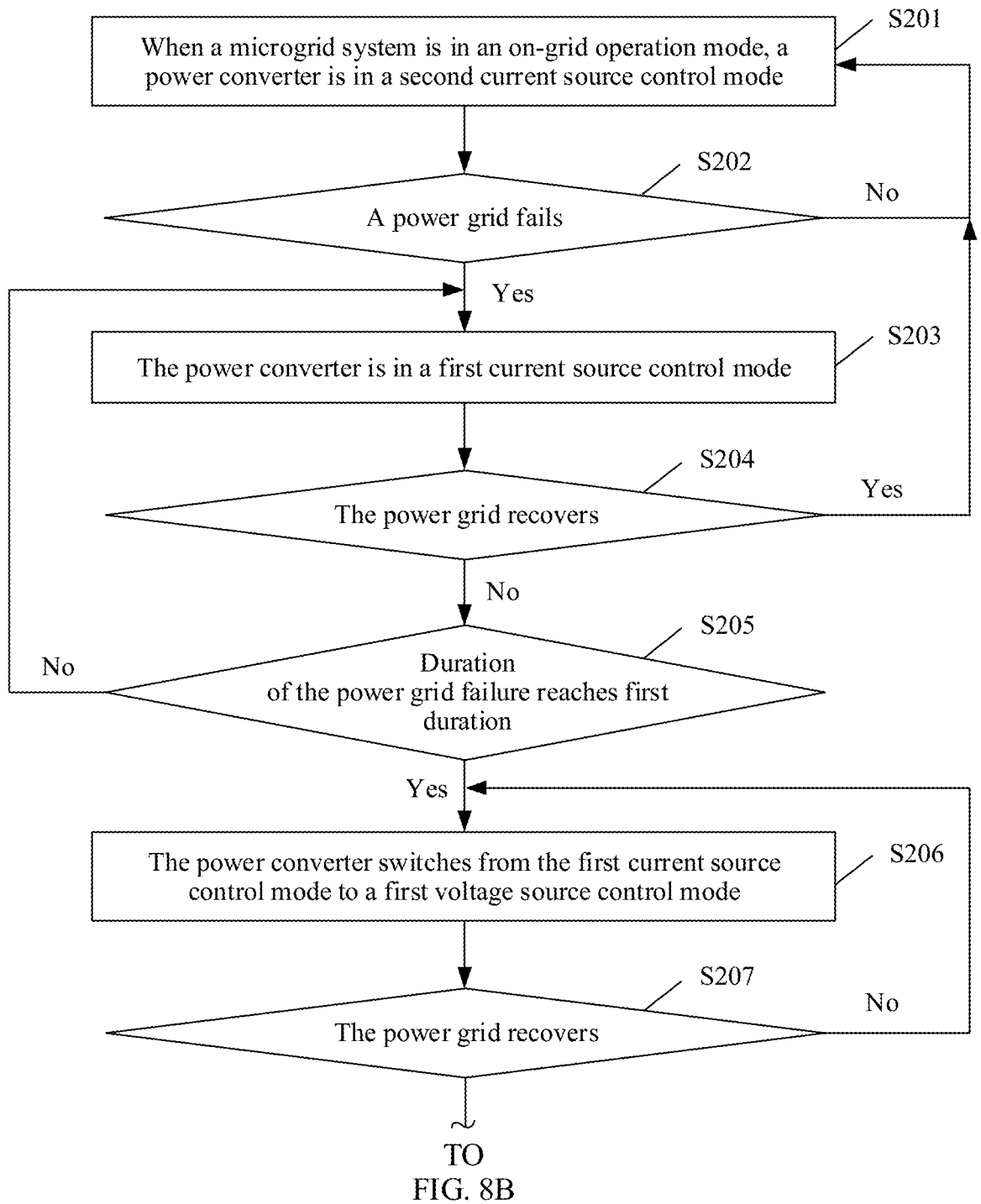
FIG. 8A and FIG. 8B are another schematic flowchart of a control method for a power converter according to this disclosure.
Figure 8B:
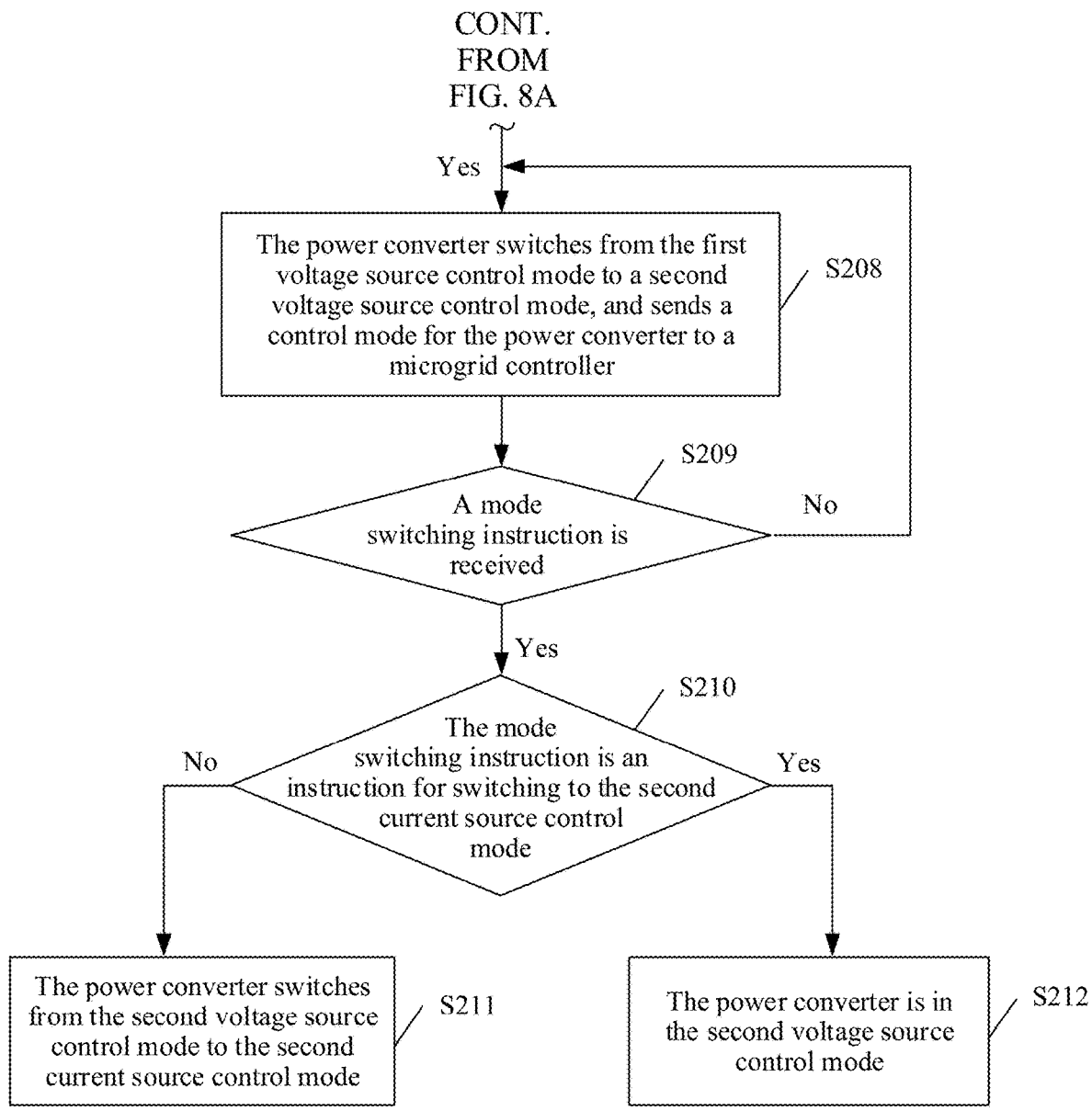

FIG. 8A and FIG. 8B are another schematic flowchart of a control method for a power converter according to this disclosure. The control method for a power converter in this embodiment of this disclosure is applicable to the power converters in the microgrid system 1 shown in FIG. 2A and FIG. 2B. The control method for a power converter may include the following steps.

S201: When a microgrid system is in an on-grid operation mode, a power converter is in a second current source control mode.

In the second current source control mode, the power converter controls an output voltage of the power converter based on a reference output active current value and a reference output reactive current value.

When the microgrid system is in the on-grid operation mode, the power converter determines the reference output active current value and the reference output reactive current value as a third reference output current value, and obtains a third reference output modulated voltage value based on the third reference output current value and a third reference angular frequency value, to control the output voltage of the power converter based on the third reference output modulated voltage value, so that the power converter is in the second current source control mode.

S202: The power converter determines whether a power grid fails.

When the output voltage of the power converter is less than a voltage threshold or an output current of the power converter is greater than a current threshold, the power converter determines that the power grid fails. Optionally, when a voltage of a microgrid bus is less than the voltage threshold, the power converter determines that the power grid fails. The power grid includes an external power grid or the microgrid system.

Then, when determining that the power grid fails, the power converter performs step S203; otherwise, the power converter performs step S201.

S203: The power converter is in a first current source control mode.

The power converter obtains a first reference output current value based on a voltage drop value of the microgrid bus in a case in which the power grid fails, and obtains a first reference output modulated voltage value based on the first reference output current value and a first reference angular frequency value, to control the output voltage of the power converter based on the first reference output modulated voltage value, so that the power converter is in the first current source control mode.

S204: The power converter determines whether the power grid recovers.

When the output voltage of the power converter is greater than or equal to the voltage threshold, the power converter determines that the power grid recovers. Optionally, when the output current of the power converter is less than or equal to the current threshold, the power converter determines that the power grid recovers. Optionally, when the voltage of the microgrid bus is greater than or equal to the voltage threshold, the power converter determines that the power grid recovers.

Then, when determining that the power grid recovers, the power converter performs step S201; otherwise, the power converter performs step S205.

S205: The power converter determines whether duration of the power grid failure reaches first duration.

The first duration is less than second duration. The second duration is a time interval between a moment at which the power grid fails and a moment at which a grid-tied switch is turned off.

After determining that the duration of the power grid failure reaches the first duration, the power converter performs step S206; otherwise, the power converter performs step S203.

S206: The power converter switches from the first current source control mode to a first voltage source control mode.

In the first voltage source control mode, the power converter controls an output voltage of the power converter based on a maximum preset current amplitude in a preset current amplitude range.

In an optional implementation, the power converter determines a second reference output current value based on the maximum preset current amplitude and an equivalent impedance angle of the external power grid, obtains a second reference output modulated voltage value based on the second reference output current value and a second reference angular frequency value, and controls the output voltage of the power converter based on the second reference output modulated voltage value, so that the power converter is in the first voltage source control mode and completes switching from the first current source control mode to the first voltage source control mode.

In another optional implementation, the power converter determines, as an initial reference output current value and an initial reference angular frequency value of the power converter in the first voltage source control mode respectively, the first reference output current value and the first reference angular frequency value of the power converter in the first current source control mode at a switching moment at which the power converter switches from the first current source control mode to the first voltage source control mode; and obtains the second reference output modulated voltage value based on the initial reference output current value and the initial reference angular frequency value, to control the output voltage of the power converter based on the second reference output modulated voltage value, so that the power converter switches from the first current source control mode to the first voltage source control mode.

S207: The power converter determines whether the power grid recovers.

When determining that the power grid recovers, the power converter performs step S208; otherwise, the power converter performs step S206.

S208: The power converter switches from the first voltage source control mode to a second voltage source control mode, and sends a control mode for the power converter to a microgrid controller.

In the second voltage source control mode, the power converter controls an output voltage of the power converter based on a reference voltage amplitude and a reference frequency value.

The power converter obtains a fourth reference output modulated voltage value based on the reference voltage amplitude and the reference frequency value, and controls the output voltage of the power converter based on the fourth reference output modulated voltage value, so that the power converter is in the second voltage source control mode and completes switching from the first voltage source control mode to the second voltage source control mode. After switching to the second voltage source control mode, the power converter sends the control mode for the power converter to the microgrid controller.

S209: The power converter determines whether a mode switching instruction is received.

When receiving the mode switching instruction, the power converter performs step S210; otherwise, the power converter performs step S208.

S210: The power converter determines whether the mode switching instruction is an instruction for switching to the second current source control mode.

When the mode switching instruction is an instruction for switching to the second current source control mode, the power converter performs step S212; otherwise, the power converter performs step S211.

S211: The power converter switches from the second voltage source control mode to the second current source control mode.

In the second current source control mode, the power converter controls an output voltage of the power converter based on a reference output active current value and a reference output reactive current value.

The power converter determines the reference output active current value and the reference output reactive current value as a third reference output current value, and obtains a third reference output modulated voltage value based on the third reference output current value and a third reference angular frequency value, to control the output voltage of the power converter based on the third reference output modulated voltage value, so that the power converter is in the second current source control mode and completes switching from the second voltage source control mode to the second current source control mode.

S212: The power converter is in the second voltage source control mode.

Herein, for a specific implementation of step S212, refer to the descriptions of step S201. Details are not described herein again.

In this embodiment of this disclosure, because the first duration is less than the second duration, it can be ensured that each power converter in the microgrid system completes switching from the failure ride-through control mode in the current source control mode to the failure ride-through control mode in the voltage source control mode before the grid-tied switch is turned off. In this way, each power converter performs both an on-grid/off-grid switching function and a failure ride-through support function during failure ride-through. In addition, dependence on communication delay performance is significantly reduced, and the power converter is prevented from injecting a disturbance signal into the external power grid to detect an off-grid state. This resolves instability of the microgrid system caused by a large switching delay of the power converter.

Figure 9:
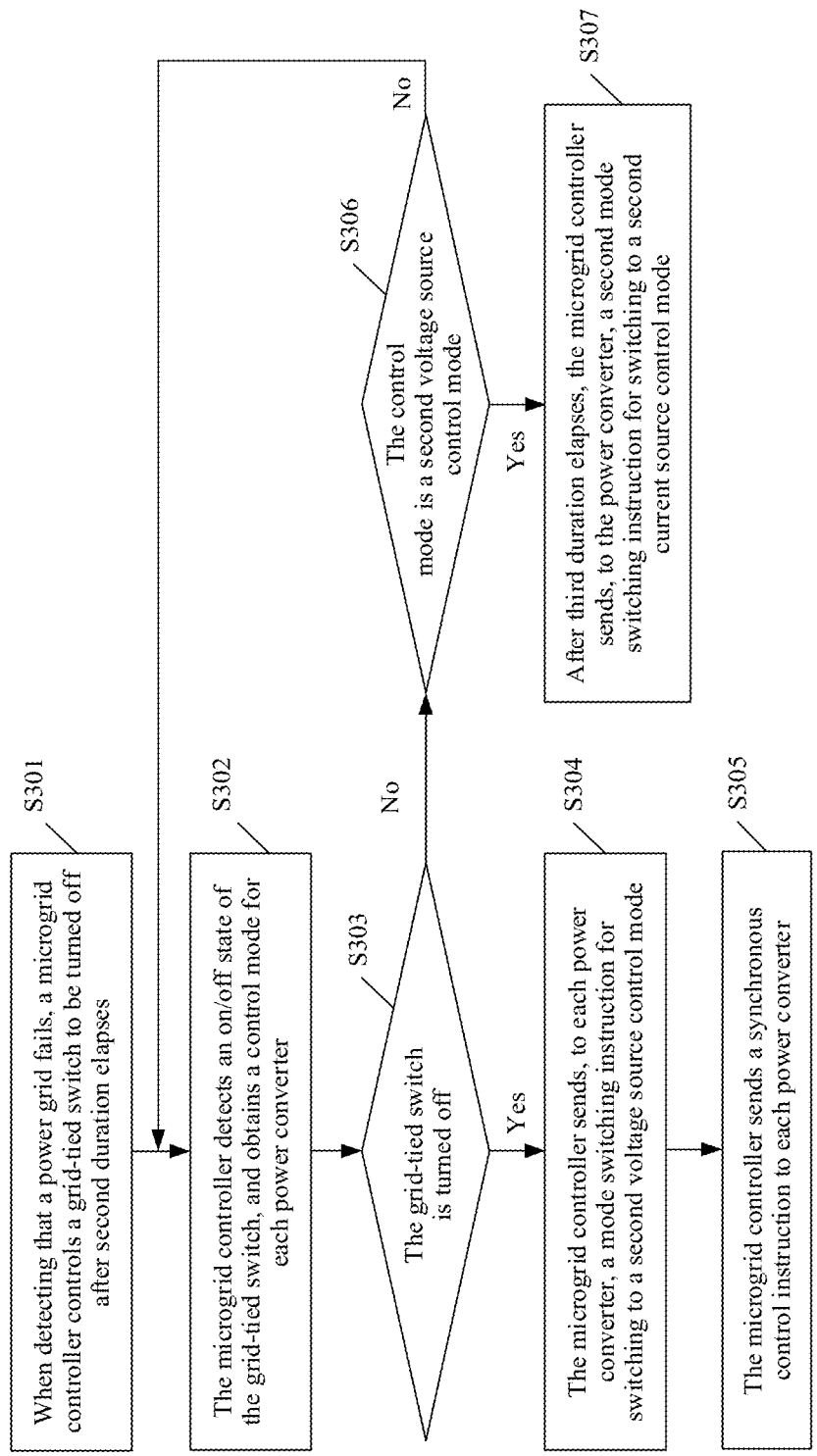
FIG. 9 is a schematic flowchart of a control method for a microgrid controller according to this disclosure.

FIG. 9 is a schematic flowchart of a control method for a microgrid controller according to this disclosure. The control method for a microgrid controller in this embodiment of this disclosure is applicable to the microgrid controller 12 shown in FIG. 2A and FIG. 2B. The control method for a microgrid controller may include the following steps.

S301: When detecting that a power grid fails, a microgrid controller controls a grid-tied switch to be turned off after second duration elapses.

The power grid includes an external power grid or a microgrid system.

When a voltage of a microgrid bus is less than a voltage threshold, the microgrid controller controls the grid-tied switch to be turned off after the second duration elapses.

S302: The microgrid controller detects an on/off state of the grid-tied switch, and obtains a control mode for each power converter.

The microgrid controller detects the on/off state of the grid-tied switch, and sends a control mode obtaining instruction to each power converter to obtain the control mode for each power converter.

S303: The microgrid controller determines whether the grid-tied switch is turned off.

When the grid-tied switch is turned off, the microgrid controller performs step S304; otherwise, the microgrid controller performs step S306.

S304: The microgrid controller sends, to each power converter, a mode switching instruction for switching to a second voltage source control mode.

The mode switching instruction for switching to the second voltage source control mode is used to control each power converter to switch to the second voltage source control mode.

S305: The microgrid controller sends a synchronous control instruction to each power converter.

The synchronous control instruction is used to control an amplitude difference between an output voltage amplitude of the power converter and a voltage amplitude of the external power grid to be less than an amplitude difference threshold, and a phase difference between an output voltage phase of the power converter and a voltage phase of the external power grid to be less than a phase difference threshold.

S306: The microgrid controller determines whether the control mode for the power converter is the second voltage source control mode.

When the control mode for the power converter is the second voltage source control mode, the microgrid controller performs step S307; otherwise, the microgrid controller performs step S302.

S307: After third duration elapses, the microgrid controller sends, to the power converter, a second mode switching instruction for switching to a second current source control mode.

The second mode switching instruction for switching to the second current source control mode is used to control the power converter to switch to the second current source control mode.

In this embodiment of this disclosure, the microgrid controller adjusts the control mode for each power converter based on the on/off state of the grid-tied switch and the control mode for each power converter, so that each power converter operates in a current source control mode when the microgrid system is in an on-grid mode, and operates in a voltage source control mode when the microgrid system is in an off-grid mode, to improve stability of the microgrid system.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A microgrid system, comprising:
    a microgrid bus;
    a grid-tied switch connected to the microgrid bus and configured to be connected to an external power grid; and
    a power converter comprising:
        a first output end connected to the microgrid bus; and
        a first input end configured to be connected to a direct current (DC) power supply,
        wherein the power converter is configured to:
            control, when a power grid fails, itself to be in a first current source control mode, wherein the first current source control mode comprises a current source failure ride-through control mode, and wherein the power grid comprises the microgrid system or the external power grid; and
            switch, after the power grid failure has occurred for a first duration, the power converter from the first current source control mode to a first voltage source control mode,
            wherein the first voltage source control mode is a voltage source failure ride-through control mode,
            wherein the first duration is less than a second duration, and
            wherein the second duration is a time interval between a first moment at which the power grid fails and a second moment at which the grid-tied switch is turned off.

2. The microgrid system of claim 1, wherein the power converter is further configured to:
    control, in the first current source control mode, based on a voltage drop value of the microgrid bus, and when the power grid fails, an output voltage of the power converter; and
    control, in the first voltage source control mode and based on a maximum preset current amplitude in a preset current amplitude range, the output voltage.

3. The microgrid system of claim 2, wherein the power converter is further configured to:
    obtain, based on the voltage drop value when the power grid fails, a first reference output current value;
    obtain, based on the first reference output current value and a first reference angular frequency value, a first reference output modulated voltage value; and
    control, based on the first reference output modulated voltage value, the output voltage such that the power converter is in the first current source control mode.

4. The microgrid system of claim 2, wherein the power converter is further configured to:
    determine, based on the maximum preset current amplitude and an equivalent impedance angle of the external power grid, a second reference output current value;
    obtain, based on the second reference output current value and a second reference angular frequency value, a second reference output modulated voltage value; and
    control, based on the second reference output modulated voltage value, the output voltage such that the power converter is in the first voltage source control mode.

5. The microgrid system of claim 4, wherein an initial reference output current value and an initial reference angular frequency value of the power converter in the first voltage source control mode are respectively the second reference output current value and the second reference angular frequency value in the first current source control mode at a switching moment.

6. The microgrid system of claim 1, wherein the power converter is further configured to be in a second current source control mode before the power grid fails, and wherein in the second current source control mode, the power converter is further configured to control, based on a reference output active current value and a reference output reactive current value, an output voltage of the power converter.

7. The microgrid system of claim 6, wherein the power converter is further configured to:
    determine the reference output active current value and the reference output reactive current value as a third reference output current value;
    obtain, based on the third reference output current value and a third reference angular frequency value, a third reference output modulated voltage value; and
    control, based on the third reference output modulated voltage value, the output voltage such that the power converter is in the second current source control mode.

8. The microgrid system of claim 6, wherein the power converter is further configured to obtain, based on a reference output active power value and an actual output active power value of the power converter, the reference output active current value.

9. The microgrid system of claim 6, wherein the power converter further comprises:
    a DC/DC circuit comprising a second output end;
    a DC/alternating current (AC) circuit comprising a second input end; and
    a DC bus that connects the second output end to the second input end, and
    wherein the power converter is further configured to obtain, based on a reference bus voltage and an actual bus voltage of the DC bus, the reference output active current value.

10. The microgrid system of claim 6, wherein the power converter is further configured to obtain, based on a reference output reactive power value and an actual output reactive power value of the power converter, the reference output reactive current value.

11. The microgrid system of claim 6, wherein the power converter is further configured to obtain, based on a reference output voltage and an actual output voltage of the power converter, the reference output reactive current value.

12. The microgrid system of claim 1, wherein the power converter is further configured to:
  switch from the first voltage source control mode to a second voltage source control mode when the power grid recovers after the power converter is in the first voltage source control mode; and
  control, while in the second voltage source control mode and based on a reference voltage amplitude and a reference frequency value, an output voltage of the power converter.

13. The microgrid system of claim 12, wherein the power converter is further configured to:
  obtain, based on the reference voltage amplitude and the reference frequency value, a fourth reference output modulated voltage value; and
  control, based on the fourth reference output modulated voltage value, the output voltage such that the power converter is in the second voltage source control mode.

14. The microgrid system of claim 1, wherein the power converter is further configured to determine, when an output voltage of the power converter is less than a voltage threshold or an output current of the power converter is greater than a current threshold, that the power grid fails.

15. The microgrid system of claim 1, further comprising a microgrid controller configured to control, when detecting that the power grid fails, the grid-tied switch to be turned off after the second duration elapses.

16. The microgrid system of claim 15, wherein the power converter is further configured to send, to the microgrid controller after switching to a second voltage source control mode, a control mode for the power converter, wherein in the second voltage source control mode, the power converter is configured to control, based on a reference voltage amplitude and a reference frequency value, an output voltage of the power converter, and wherein the microgrid controller is configured to:
  send, to the power converter when the grid-tied switch is in an off state and the control mode for the power converter is the second voltage source control mode, a synchronous control instruction, wherein the synchronous control instruction controls a first amplitude difference between an output voltage amplitude of the power converter and a voltage amplitude of the external power grid to be less than an amplitude difference threshold, and wherein a first phase difference between an output voltage phase of the power converter and a voltage phase of the external power grid is to be less than a phase difference threshold; and
  control the grid-tied switch to be turned on when a second amplitude difference between a first-end voltage amplitude and a second-end voltage amplitude of the grid-tied switch is less than the amplitude difference threshold and when a second phase difference between a first-end voltage phase and a second-end voltage phase of the grid-tied switch is less than the phase difference threshold.

17. The microgrid system of claim 16, wherein the microgrid controller is further configured to send, to the power converter, when the grid-tied switch is in an on state, when the control mode is the second voltage source control mode, and after a third duration elapses, a mode switching instruction, wherein the mode switching instruction controls the power converter to switch to a second current source control mode, and wherein in the second current source control mode, the power converter is further configured to control, based on a reference output active current value and a reference output reactive current value, the output voltage.

18. A power converter, comprising:
  a first output end configured to be connected to a microgrid bus; and
  a first input end configured to be connected to a direct current (DC) power supply,
  wherein the power converter is configured to:
    control, when a power grid fails, itself to be in a first current source control mode, wherein the first current source control mode comprises a current source failure ride-through control mode, and wherein the power grid comprises a microgrid system or an external power grid; and
    switch, after the power grid failure has occurred for a first duration, the power converter from the first current source control mode to a first voltage source control mode,
    wherein the first voltage source control mode is a voltage source failure ride-through control mode,
    wherein the first duration is less than a second duration, and
    wherein the second duration is a time interval between a first moment at which the power grid fails and a second moment at which a grid-tied switch is turned off.

19. The power converter of claim 18, further configured to:
  control, in the first current source control mode, based on a voltage drop value of the microgrid bus, and when the power grid fails, an output voltage of the power converter; and
  control, in the first voltage source control mode and based on a maximum preset current amplitude in a preset current amplitude range, the output voltage.

20. A method, comprising:
  detecting whether a power grid fails, wherein the power grid comprises a microgrid system or an external power grid;
  controlling, when the power grid fails, a power converter to be in a first current source control mode, wherein the first current source control mode is a current source failure ride-through control mode, and wherein an input end and an output end of the power converter are connected to a direct current power supply and a microgrid bus respectively, and the microgrid bus is connected to an external power grid through a grid-tied switch; and
  switching, after the power grid failure has occurred for a first duration, the power converter from the first current source control mode to a first voltage source control mode,
  wherein the first voltage source control mode is a voltage source failure ride-through control mode,
  wherein the first duration is less than a second duration, and
  wherein the second duration is a time interval between a first moment at which the power grid fails and a second moment at which a grid-tied switch is turned off.

* * * * *